United States Patent [19]

Hirose et al.

[11] Patent Number: 5,926,821
[45] Date of Patent: Jul. 20, 1999

[54] FILE CONTROL METHOD AND SYSTEM FOR ALLOCATING A FREE BLOCK TO A FILE WHEN THE PREVIOUSLY ALLOCATED BLOCK IS TO BE WRITTEN TO

[75] Inventors: Nozomu Hirose, Yokohama; Kumiko Yagi, Kawasaki; Miho Iwanaga, Ebina; Hirofumi Yamashita, Kawasaki, all of Japan

[73] Assignee: Hitachi, Ltd., Tokyo, Japan

[21] Appl. No.: 08/909,073

[22] Filed: Aug. 14, 1997

[30] Foreign Application Priority Data

Aug. 19, 1996 [JP] Japan .................................. 8-217579

[51] Int. Cl.$^6$ ................................................. G06F 17/30
[52] U.S. Cl. ............................................. 707/202; 707/205
[58] Field of Search ................................. 707/202, 205

[56] References Cited

U.S. PATENT DOCUMENTS 5,504,883  4/1996  Coverston et al. ..................... 707/202
5,829,005  10/1998  Senator .................................. 707/100

OTHER PUBLICATIONS

M.J. Bach, "The Design Of The Unix Operating System", PP.100–103 (1986).
H. Custer, "Inside The Windows NT File system", PP.36–43 (1994).

Primary Examiner—Thomas G. Black
Assistant Examiner—John C. Loomis
Attorney, Agent, or Firm—Antonelli, Terry, Stout & Kraus, LLP

[57] ABSTRACT

A file control method by which a number of a block first allocated to a file is saved in an external memory and data and a number of a block to be next linked or a flag indicative of an idle block are recorded in each block to thereby restore the file information, and a version of each block is recorded therein to thereby allow easy access to a data block of the specified version. A number of a head block in the file is always saved in an allocated block list of a file information area. The data and the number of the block to be next linked or the identifier indicative of an idle block are recorded in each block of the data storage area. A file control program, when it is desired to add new data to the file, allocates a spare idle block to the file. When file writing operation is interrupted, the head block number and the next block number of each block in the file information area are traced up to the idle block to thereby restore a file information table.

14 Claims, 24 Drawing Sheets

FIG. 2A

8 FILE INFORMATION TABLE

| FILE NAME | FILE LENGTH | OPEN FLAG | DELETION FLAG | ALLOCATED BLOCK LIST | | | | | LAST BLOCK NUMBER | TEMPORARILY ALLOCATED BLOCK NUMBER |
|---|---|---|---|---|---|---|---|---|---|---|
| XXX | 3 | 1 | 0 | 1 | 3 | 4 | -1 | ... | 4 | 5 |
| AAA | 3 | 0 | 0 | 10 | 11 | 12 | -1 | ... | 12 | -1 |
| ... | ... | ... | ... | ... | ... | ... | ... | | ... | ... |

11 FILE INFORMATION AREA

| FILE NAME | FILE LENGTH | OPEN FLAG | DELETION FLAG | ALLOCATED BLOCK LIST | | | | | LAST BLOCK NUMBER |
|---|---|---|---|---|---|---|---|---|---|
| XXX | 2 | 1 | 0 | 1 | 3 | -1 | -1 | ... | 3 |
| AAA | 3 | 0 | 0 | 10 | 11 | 12 | -1 | ... | 12 |
| ... | ... | ... | ... | ... | ... | ... | ... | | ... |

20 — 21 — 22 — 26 — 23 — 24

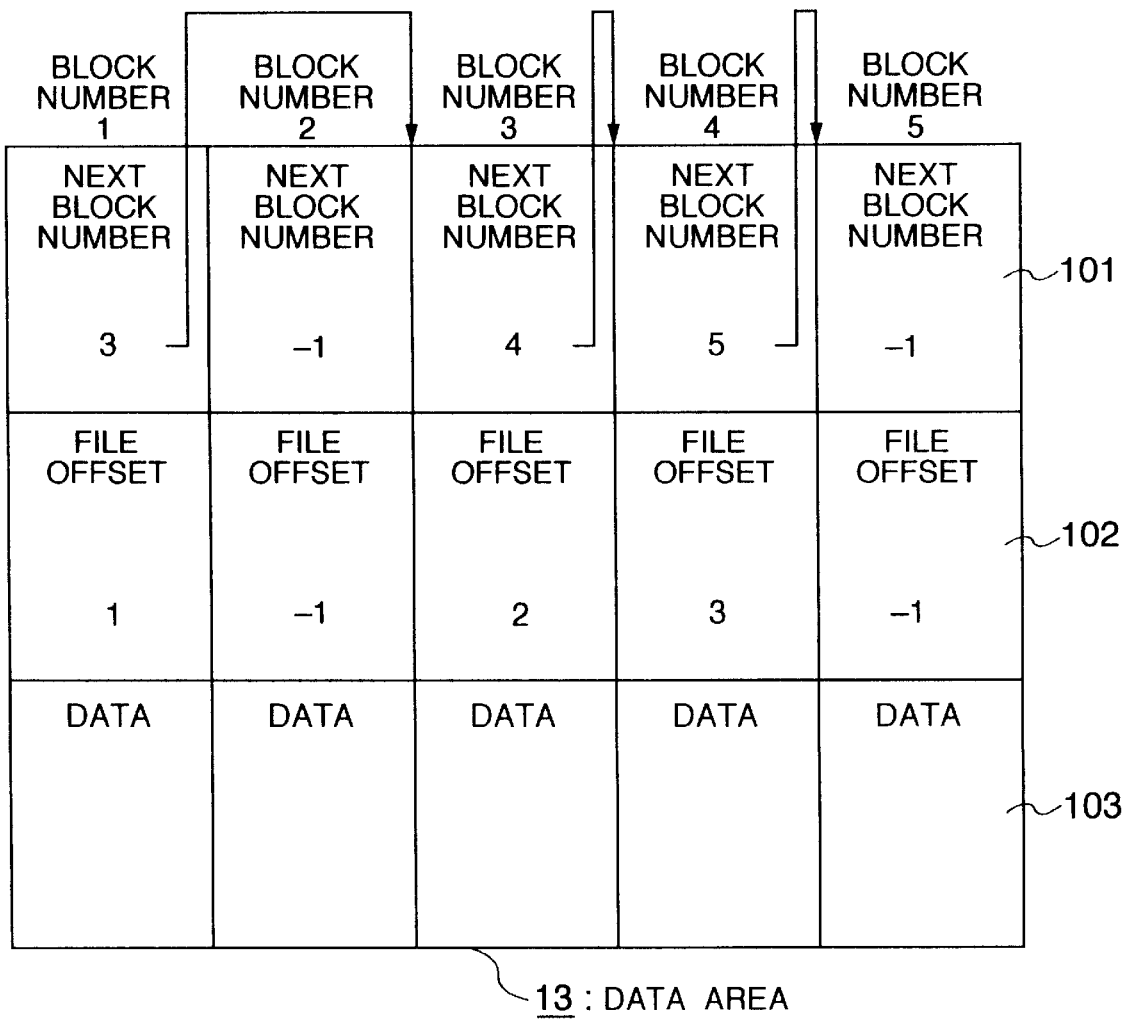

| FILE NAME ~80 | FILE ID ~87 | VERSION ~88 | FILE LENGTH ~81 | FILE STATUS ~89 | ALLOCATED BLOCK LIST ~83 | | | LAST BLOCK NUMBER ~84 | TEMPORARILY ALLOCATED BLOCK NUMBER ~85 | OVER-WRITTEN BLOCK LIST ~90 | | NEXT BLOCK NUMBER TABLE MEMORY AREA ~95 |
|---|---|---|---|---|---|---|---|---|---|---|---|---|
| XXX | 3246 | 2 | 2 | IN USE | 1 | 4 | −1 | 4 | 5 | 3 | −1 | (see 96 below) |
| AAA | 3247 | 1 | 3 | SAVED | 10 | 11 | 12 | 12 | −1 | −1 | | |
| ⋮ | ⋮ | ⋮ | ⋮ | ⋮ | ⋮ | ⋮ | ⋮ | ⋮ | ⋮ | ⋮ | ⋮ | ⋮ |

96:

| VERSION ~97 | NEXT BLOCK NUMBER ~98 |
|---|---|
| 2 | 5 |
| −1 | −1 |

FIG. 13B

| 20 FILE NAME | 27 FILE ID | 28 VERSION | 21 FILE LENGTH | 29 FILE STATUS | 23 ALLOCATED BLOCK LIST | | | 24 LAST BLOCK NUMBER | 30 HEAD BLOCK NUMBER TABLE MEMORY AREA |
|---|---|---|---|---|---|---|---|---|---|
| XXX | 3246 | 2 | 2 | IN USE | 1 | 3 | −1 | 3 | 91 VERSION / 92 HEAD BLOCK NUMBER:  0 / −1,  1 / −1 |
| AAA | 3247 | 1 | 3 | SAVED | 10 11 | 12 | −1 | 12 | |
| ⋮ | ⋮ | ⋮ | ⋮ | ⋮ | ⋮ | ⋮ | ⋮ | ⋮ | ⋮ |

7 : BLOCK ALLOCATION TABLE

| BLOCK NUMBER | STATUS |
|---|---|
| 1 | IN USE |
| 2 | NOT USED |
| ... | ... |

FIG. 14B

12 : BLOCK ALLOCATION INFORMATION AREA

| BLOCK NUMBER | STATUS |
|---|---|
| 1 | IN USE |
| 2 | NOT USED |
| ... | ... |

FIG. 15

| | BLOCK NUMBER 1 | BLOCK NUMBER 2 | BLOCK NUMBER 3 | BLOCK NUMBER 4 | BLOCK NUMBER 5 |
|---|---|---|---|---|---|
| NEXT BLOCK NUMBER TABLE ~104 | VERSION: 0, -1, -1 / NEXT BLOCK NUMBER: 3, -1, -1 | VERSION: -1, -1, -1 / NEXT BLOCK NUMBER: -1, -1, -1 | VERSION: 0, 2, -1 / NEXT BLOCK NUMBER: -1, 4, -1 | VERSION: 2, -1, -1 / NEXT BLOCK NUMBER: 5, -1, -1 | VERSION: -1, -1, -1 / NEXT BLOCK NUMBER: -1, -1, -1 |
| FILE OFFSET ~102 | 1 | -1 | 2 | 3 | -1 |
| FILE ID ~105 | 3246 | -1 | 3246 | 3246 | -1 |
| BLOCK STATUS ~106 | IN USE | NOT USED | OVERWRITTEN | IN USE | NOT USED |
| DATA ~103 | DATA | DATA | DATA | DATA | DATA |

13 : DATA AREA

FILE CONTROL METHOD AND SYSTEM FOR ALLOCATING A FREE BLOCK TO A FILE WHEN THE PREVIOUSLY ALLOCATED BLOCK IS TO BE WRITTEN TO

BACKGROUND OF THE INVENTION

The present invention relates to file control based on an electronic computer and more particularly, to a file control method based on unique file control information and file structure.

There is conventionally suggested such a method for storing files in an external memory in a computer system as provided by a UNIX (which is a registered trademark in U.S. and other countries exclusively licensed by the X/Open corporation) operating system. In the UNIX operating system, the external memory is controlled as divided into units called blocks to provide a means for recording data to be stored therein by computer's user into a file corresponding to a set of such blocks. In the UNIX operating system, the file is controlled based on control information known as i node. The i node stores therein a list of serial numbers of the blocks constituting the file. The i node is stored in the external memory while the computer's user does not use the file, whereas, when the user actually starts using the file to refer to or update the file, the i node is read into a main memory of the computer. When it is required to add a new block to the file to newly add data to the file, the UNIX operating system records the allocation of the new block only in the i node of the main memory and the updating of the i node of the external memory is postponed to reduce its overhead. Such a UNIX operating system as operates in the aforementioned manner is disclosed in a book entitled "THE DESIGN OF THE UNIX OPERATING SYSTEM", written by M. J. Bach, pp. 100–103 (1986). Under this condition, when the computer becomes faulty and stops during writing operation of the data into the external memory, the contents of the i node in the main memory are lost and the i node of the external memory is not updated yet, which results in that information on which block was newly allocated to which block is lost and it becomes impossible to extract data concerning the newly added block after the start of use of the file.

Further, in order to prevent the loss or missing of control information of the file even when a failure occurs in the computer, there has been provided a file storage method for leaving such an operational record as a block addition to a file in an external memory simultaneously with the writing operation of user's data in the external memory. Such a file storage method as carried out in the aforementioned manner is disclosed in a book entitled "INSIDE THE Windows NT File System", written by H. Custer, pp. 36–43 (1994). In this method, even a failure takes place in a computer, it can be avoided that control information of a file is lost. This method is however disadvantageous in that the number of write requests to the external memory is increased and thus overhead at the time of writing data in the file is also increased, because an area for storage of user's data on the external memory is separated from an area for storage of its operational record thereon.

SUMMARY OF THE INVENTION

The prior art file storage method has had a problem that file control information is lost at the time of a failure occurrence and there is a danger that data during writing operation in an external memory cannot be restored. Further, the above method for writing the file operational record simultaneously with the data writing operation has had a problem that the overhead is increased when compared to that in the UNIX operating system, through the reliability can be made higher.

It is therefore an object of the present invention to provide a file control method for facilitating addition of a new block to a file.

Another object of the present invention is to, when a failure takes place in a computer, restore control information of a file during its data writing operation, without involving a substantial increase in overhead.

A further object of the present invention is to provide a file control method, when data in a file is to be updated, for saving data before the updating.

Yet a further object of the present invention is to provide a file control method for discriminating between data before and after updating by their version to facilitate easy access to a data block of a specified version.

In accordance with an aspect of the present invention, there is provided a file control method which is implemented by execution of a file control program stored in a main memory of a computer, and which comprises a step of, prior to addition of a new data block to a file, previously allocating a spare not-used block to the file; and a step of, when the new data block is added to the file, storing the new data in the previously-allocated not-used block and allocating another spare not-used block to the file.

In the file control method according to another aspect of the present invention, a number of a block first allocated to the file is recorded on the external memory as control information of the file, data and the number of a block next linked thereto or an identifier indicative of an idle block is recorded in each block allocated to the file; an allocated block list in which the numbers of blocks allocated to the file are arranged in an order of positions of the blocks (relative block numbers) in the file, is previously stored in a main memory of the computer, so that, when it is desired to add new data to the file, a number of a block having the new data to be stored therein is sequentially added to the allocated block list; when adding operation of the new data to the file is interrupted, the file control information recorded in the external memory and the block number recorded in each block to be next linked thereto are sequentially traced up to an idle block to thereby restore the allocated block list in the main memory.

In the invention, since the number of the block first allocated to the file is saved in the external memory and the data of the blocks in the file and the numbers of the blocks to be next linked are recorded in the blocks, the allocated block list during the data writing operation can be restored by sequentially tracing the blocks starting with the block first allocated to the file. In addition, since the numbers of the next-linked blocks recorded in the blocks can be recorded simultaneously through once data writing operation, the overhead to the external memory will not be increased remarkably.

In accordance with another aspect of the present invention, there is provided a file control method which comprises the steps of, prior to data writing of the block added to the file for the new data or of the block for the existing data block updating, previously allocating a spare not-used block to the file; and, when the data writing is carried out, storing new writing data in the previously-allocated not-used block and allocating another spare not-used block to the file.

In the file control method according to further another aspect of the present invention, each time use of the file is started, a version of the file is updated, the version of the file and a number of the block first allocated for the file version are recorded in the external memory as file control information, and data and a number of the block to be next linked for the version of the block or an identifier indicative of an idle block are recorded in each block allocated to the file; when the version is specified, a number or the head block of the file of the specified version is acquired by referring to control information on the file, the numbers of the blocks of the specified version to next be linked are sequentially traced up to an idle block to thereby prepare an allocated block list in which the numbers of the block in the file of the specified version are arranged in an order of positions (relative block numbers) of the block in the file, and access is made to the block corresponding to the specified block position on the basis of the allocated block list.

BRIEF DESCRIPTION OF THE DRAWINGS

FIG. 2A shows a data format of a file information table 8 in the first embodiment;

FIG. 2B shows a data format of a file information area 11 in the first embodiment;

FIG. 3A shows a data format of a block allocation table 7 in the first embodiment;

FIG. 3B shows a data format of a block allocation information area 12 in the first embodiment;

FIG. 4 shows a data format of a data area 13 in the first embodiment;

FIG. 13A shows a data format of a file information table 8 in a second embodiment;

FIG. 13B shows a data format of a file information area 11 in the second embodiment;

FIG. 14A shows a data format of a block allocation table 7 in the second embodiment;

FIG. 14B shows a data format of a block allocation information area 12 in the second embodiment;

FIG. 15 shows a data format of a data area 13 in the second embodiment;

DESCRIPTION OF THE PREFERRED EMBODIMENTS

Explanation of embodiment of the present invention will be detailed with reference to the attached drawings.

(1) First Embodiment

Figure 1:
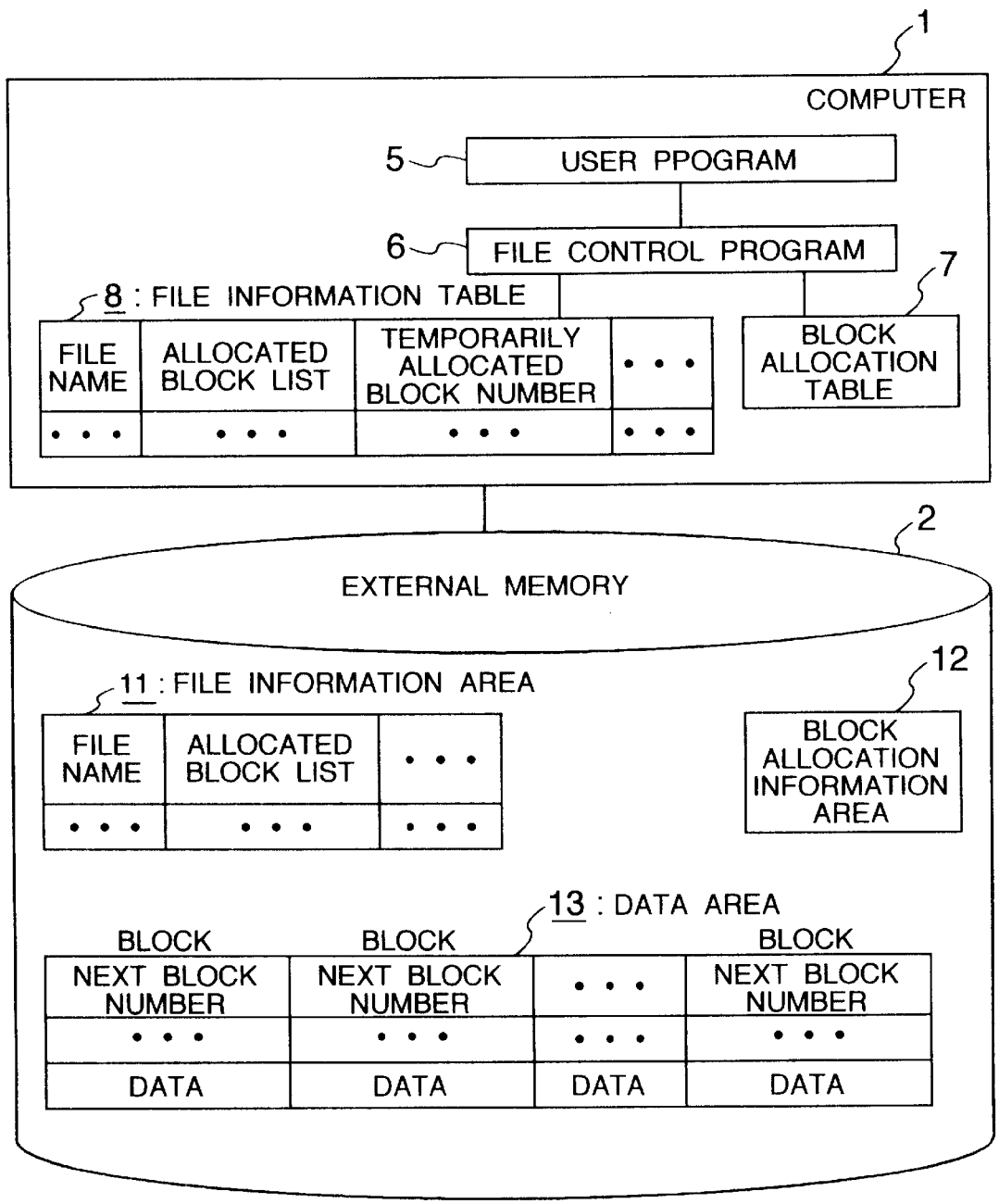
FIG. 1 is an arrangement of a file control system in accordance with a first embodiment.

FIG. 1 is an arrangement of a file control system in accordance with a first embodiment. A computer 1 includes a main memory which stores therein a user program 5, a file control program 6, a file information table 8 and a block allocation table 7. An external memory 2 has a file information area 11, a block allocation information area 12 and a data area 13. The file information table 8 stores allocated block lists on the external memory 2 and sparely allocated idle blocks (temporarily allocated blocks) with respect to files. The block allocation table 7 stores block information indicative of whether the blocks of the external memory 2 are in use or not. The file information area 11 stores therein allocated block lists on the external memory 2 with respect to files. The block allocation information area 12 stores therein block allocation information on whether or not the blocks in the external memory 2 are in use. The data area 13 is divided into blocks of a fixed length, and each block is made up of a zone in which such control information is recorded as to record the number of a next block in an identical file and a zone adjacent to the first-mentioned zone in which associated data contents are recorded. File entity comprises a set of blocks sequentially chained or concatenated, the last one of the chained blocks records therein the number of a temporarily allocated block as the next block.

The user program 5 is a processor which functions to issue to the file control program 6 such a request as to read out or write data from or in a file or to delete the file. The file control program 6, at the time of starting the computer 1, reads the contents of the file information area 11 and block allocation information area 12 into the file information table 8 and block allocation table 7 respectively. The file control program 6, when receiving a data read request, looks up the allocated block lists of the file information table 8 to acquire a block number associated with a specified file read position, reads out from the data area 13 the data contents of the block having the acquired block number, and passes the read data contents to the user program 5. On the other hand, the file control program 6, when receiving a data write request and when the data write is a new data write, looks up the block allocation table 7 to search for non-use blocks, and writes the data contents into the block corresponding to the specified file write position after updating the temporarily allocated block number and allocated block list on the file information table 8. At this time, the number of the newly allocated temporarily-allocated block is written as the number of a block next to the data-written block. The file control program 6, after completing use of the file, stores a copy of the file in question of the file information table 8 and the block allocation table 7 in the file information area 11 and block allocation information area 12 respectively. When a trouble occurred in the computer 1 causes the file information table 8 and block allocation table 7 to be lost, the file control program 6 refers to the file information area 11, block allocation information area 12 and data area 13 to restore the file information table 8 and block allocation table 7.

FIG. 2A shows an exemplary data format of the file information table 8. A file name 80 denotes a name of a file set by a user, a file length 81 is the length of the file represented in terms of the number of blocks (block number). In the file information table 8, the file name 80 on a row having not file control information is blank. An open (in-use-file) flag 82 is set at 1 when new preparation of the file or use thereof is started and is set at 0 when the file use is completed. A deletion (during-deletion-file) flag 86 is set at 1 when deleting operation of the file is started and is set at 0 when the file deletion is completed. An allocated block list 83, which is a list of blocks allocated to the file, has items 83-1, 83-2, . . . , which store therein numbers of the blocks allocated to the head, second, . . . positions of the file respectively. An item to which a block is not allocated, has a value of −1 invalid for the block number written therein. A last block number 84 denotes the number of last one of the blocks of the file. A temporarily allocated block number 85 denotes the number of an idle block sparely allocated. A value of −1 in the temporarily allocated block number 85 indicates that there is no temporarily allocated block. The file information table 8 is provided on the main memory for high speed accessing to the control information on a target file therein.

FIG. 2B shows an exemplary data format of the file information area 11. The file information area 11 has a file name 20, a file length 21, an open flag 22, a deletion flag 26, an allocated block list 23 and a last block number 24; which respectively have the same meanings as the file name 80, file length 81, open flag 82, deletion flag 86, allocated block list 83 and last block number 84. At the time of starting the computer 1, the contents of the file information area 11 are read into the computer 1 to prepare the file information table 8. When use of a file is completed, the contents of the file in the file information table 8 is again written in the file information area 11. In FIG. 2, a difference in contents between the file information table 8 and file information area 11 means that a file having a file name XXX is in use and thus the contents of the file information table 8 updated by the file use are not reflected yet on the file information area 11.

FIG. 3A shows an exemplary data format of the block allocation table 7. In the block allocation table 7, each block number 71 is associated with status 72 indicative of whether the block in question is in use (symbol 1) or not (symbol 0). The block allocation table 7 is provided on the main memory, when it is desired to allocate blocks to the file or release the block allocation, to realize high-speed accessing thereto.

FIG. 3B shows an exemplary data format of the block allocation information area 12. In the block allocation information area 12, each block number 31 is associated with status 32 indicative of whether the block in question is in use (symbol 1) or not (symbol 0). At the time of starting the computer 1, the contents of the block allocation information area 12 are read into the computer 1 to prepare the block allocation table 7. When use of a file is completed, the contents of the block allocation table 7 are again written in the block allocation information area 12.

FIG. 4 shows an exemplary data format of the data area 13. The data area 13 comprises a plurality of blocks which are named by serial numbers starting with a block number 1. Each block has next block number information 101 and file offset information 102 in its head part. When the block in question is allocated to a file, the next block number information 101 has a block number allocated to the next block of the block in question in the file. In the examples of FIGS. 2 and 4, with regard to the file with the file name XXX, the block allocated as the head block of the file has the block number 1 and the block allocated to the second block thereof has the block number 3. The next block number information 101 of such a block not allocated to any files as the block of the block number 2 or of such a block allocated as the last block of the file but not written with any data as the block of the block number 5, has the next block number information 101 having a value of −1 that is invalid as the block number. The file offset information 102, which indicates the position of the block in the file, is named by a serial number starting with a relative block number 1. In the examples of FIGS. 2 and 4, blocks having block numbers 1, 3 and 4 are allocated to the file having the file name XXX and the associated file offset information indicates 1, 2 and 3 respectively. Data information 103 indicates data written in the file under control of the user program 5.

Explanation will then be made as to the operation of the file control program 6 when the user program 5 issues to the file control program 6 a new file preparation request, a file use start, request, a data read request, a data write request, a file use end request or a file deletion request as well as the file information restoring operation of the file control program 6 after the computer 1 became faulty. When it is desired to newly prepare a file, it is necessary for the user program 5 to issue the new file preparation request. For example, this request is issued through such a system call as OPEN or CREATE. When it is desired to access an existing file, the user program 5 is required to issue the file use start request, in which case the request is issued through such a system call as OPEN. After the user program 5 issues the data read request or file use start request and the file control program 6 normally accepts the request, it is possible to issue the data read or write request by any number of times. When it is desired to terminate the preparation or use of the new file, it is necessary for the user program 5 to issue the file use end request, which request is issued through such a system call as CLOSE. The file deleting operation is independent of the aforementioned series of file operations, and is executed when the user program 5 issues such a system call as to request the file deletion or a user interface (not shown) issues such a command as to request the file deletion. With respect to the allocation of an idle block to a file, when the user program 5 issues the new file preparation request, file use start request or new data write request, the file control program 6 allocates an idle block to the file; whereas, when the user program 5 issues the file use end request, the file control program 6 releases the allocation of the sparely-allocated idle block.

Figure 5:
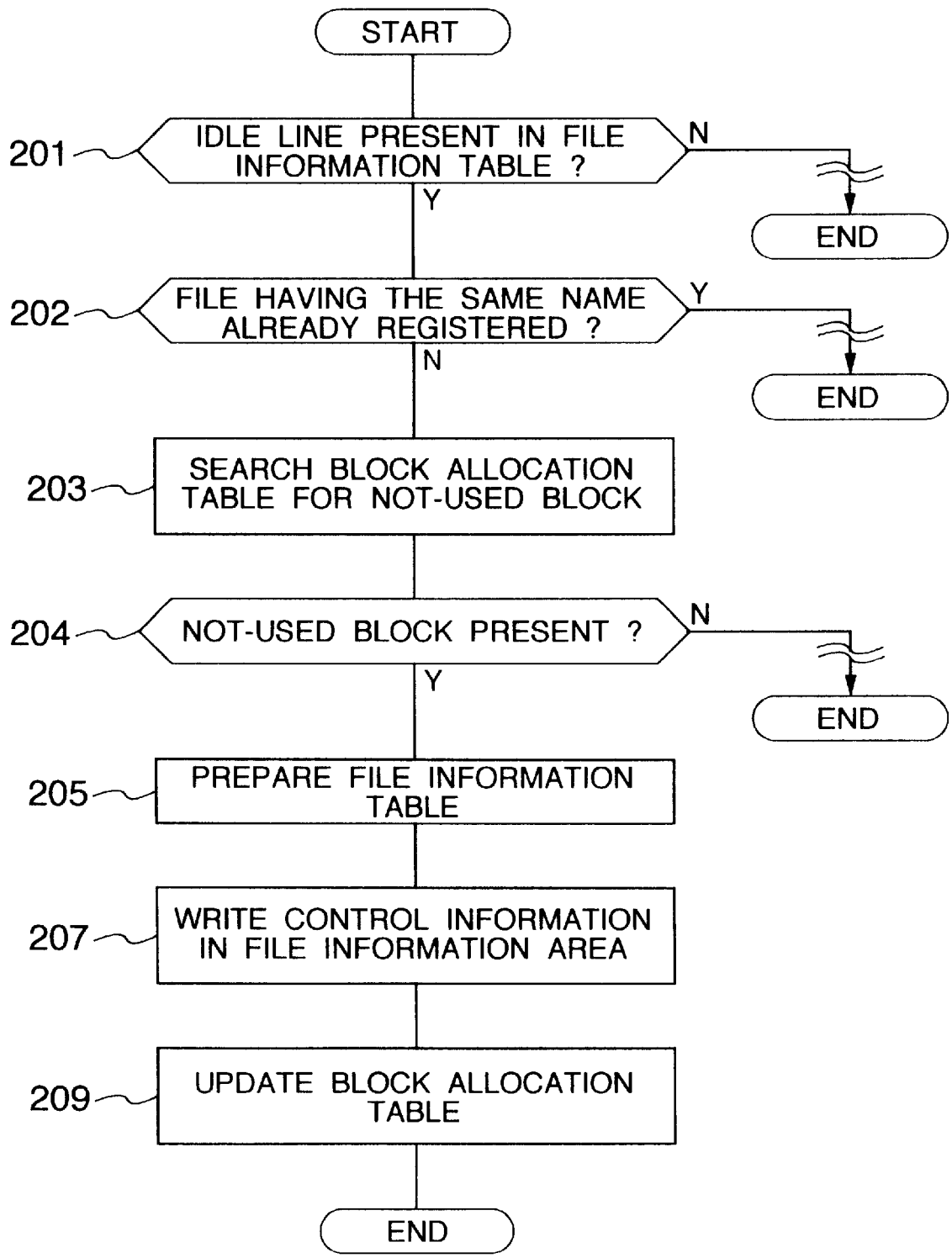
FIG. 5 is a flowchart for explaining a processing procedure of a file new preparation request in the first embodiment.

FIG. 5 is a flowchart for explaining a processing procedure of a new file preparation request in the first embodiment. When the file control program 6 looks up the file information table 8 to search for such an idle row that can record new file information (step 201). When there is no idle row (N in the step 201), the file control program 6 terminates the processing operation because it is impossible to record information on a file to be newly prepared. When there is an idle row (Y in the step 201), the file control program 6 examines whether or not a file having the same file name as that of the file to be newly prepared is already recorded in the file information table 8 (step 202). In the presence of a file having the same file name (Y in the step 202), the file control program 6 terminates its operation because a file having the same file name as that of the file to be newly prepared is already present. In the absence of a file having the same file name (N in the step 202), the file control program 6 looks up the block allocation table 7 to search for a block not used yet on the data area 13 of the external memory 2. The file control program 6 then judges whether a not-used block is present or not (step 204). Since no presence of a not-used block (N in the step 204) makes it impossible to store data in the external memory 2 because there is no block to write the data therein even for preparation of a new file. Therefore, the file control program 6 terminates its operation. In the presence of a not-used block (Y in the step 204), the file control program 6 records at the step 201 the file name 80, file length 81 (which is set at 0 because the file control program 6 is in the new file preparation mode) of a file to be newly prepared and specified by the user program 5, 1 (i.e., in use) for the open flag 82, 0 (not in the deletion mode) for the deletion flag 86, −1 (which is invalid as a block number) for the last block number 84, −1 for all the items of the allocated block list 83, and the number of a not-used block found as a result of the searching operation of the step 203 for the temporarily allocated block number 85, on an idle row or line of the file information table 8 found as a result of the searching operation of the step 201 (step 205). The file control program 6 next records the file name 20 and file length 21 of the file to be newly prepared, 1 (i.e., in use) for the open flag 22, 0 (not in the deletion mode) for the deletion flag 26, and the number of a block found as a result of the searching operation of the step 203 for the leading item 23-1 of the allocated block list 23, on an idle row or line of the file information area 11 (step 207). The file control program 6 stores −1 for the remaining items of the allocated block list 23 and for the last block number 24. The system then updates the block allocation table 7 to change the allocation information 72 found at the step 203 to 1 ("in use") (step 209).

In accordance with the aforementioned procedure, such file information as the file name or file length are at the step 207 written in the file information area 11 of the external memory 2, so that, even when a fault occurred in the computer 1 after the completion of the step 207, the information of the newly-prepared file is already recorded on the external memory 2. When a fault takes place in the computer 1 prior to the completion of the step 207, the file information area 11 and block allocation information area 12 are not updated at all, so that, after removal of the fault of the computer 1, the file control program 6 can again execute the new file preparing operation under the same A condition as in the fault occurrence.

Figure 6:
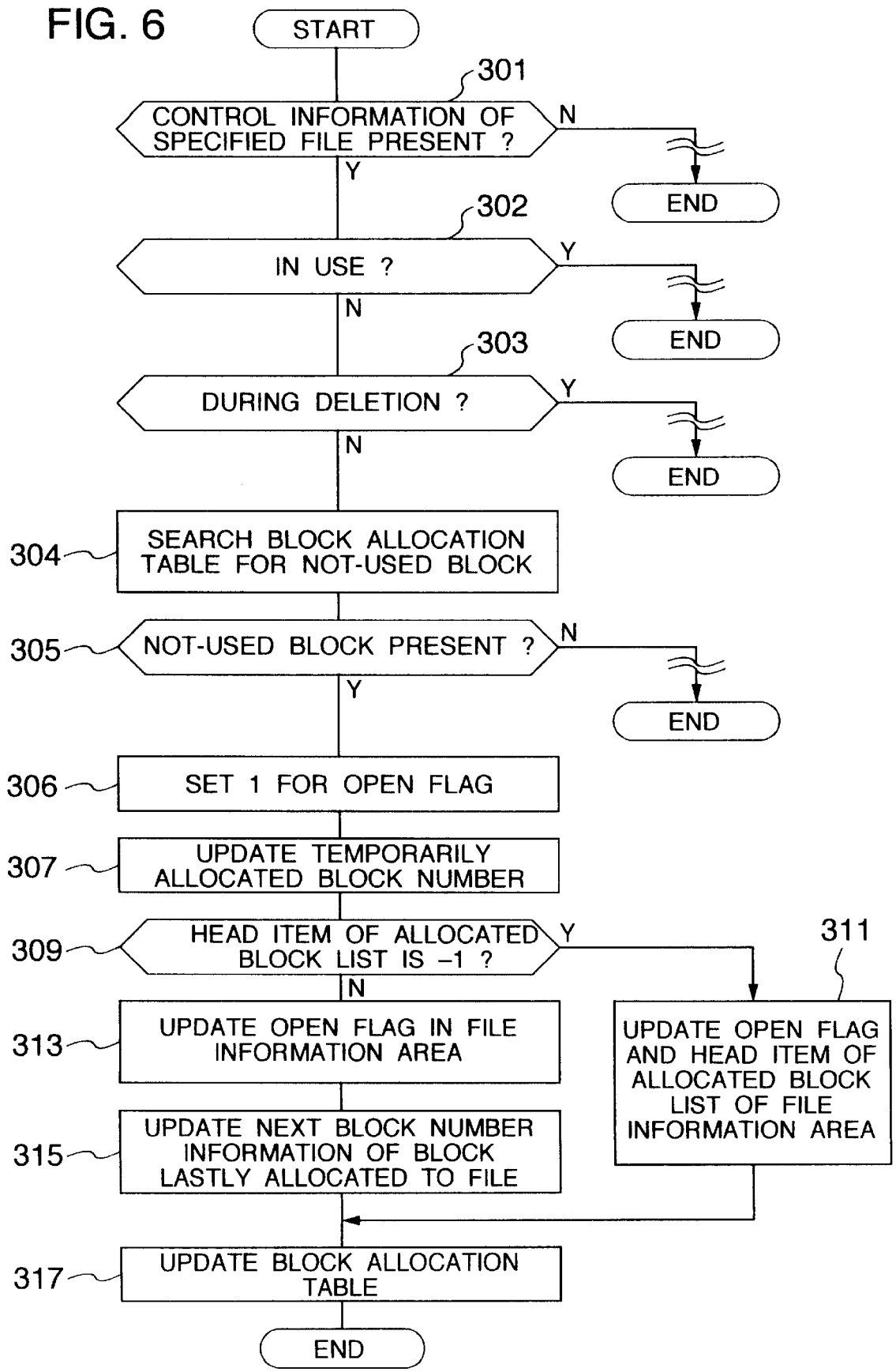
FIG. 6 is a flowchart for explaining a processing procedure of a file use start request in the first embodiment.

FIG. 6 is a flowchart for explaining a processing procedure of the file use start request. The file control program 6, when accepting the file use start request, searches the file information table 8 to judge whether or not there is information of a file having the file name specified by the user (step 301). The absence of the information (N in the step 301) causes the file control program 6 to terminate its operation because there is no file for the user to ask to start its use. The presence of the information (Y in the step 301) causes the file control program 6 to look up the open flag 82 to judge whether or not the tile asked to use it by the user is in its use (step 302). If the file is not in its use (Y in the step 302), then the file control program 6 terminates its operation. If not (N in the step 302), then the file control program 6 judges whether or not the file is in its deletion (step 303). If the file is in its deletion (Y in the step 303), then the file control program 6 terminates its operation. If not (N in the step 303), then the file control program 6 looks up the block allocation table 7 to search for a not-used block (step 304). When a not-used block is not present (N in the step 305), the file control program 6 terminates its operation. The presence of a not-used block (Y in the step 305) causes the file control program 6 to set 1 (in use) for the open flag 82 of the file asked to use it by the user (step 306). Thereafter, the file control program 6 records the number of a not-used block found at the step 304 as the temporarily allocated block number 85 of the file information table 8 (step 307). The file control program 6 then refers to the allocated block list 83 corresponding to the file of the file information table 8 asked to use it by the user to judge whether or not the first item 83-1 of the allocated block list has a value of −1 (step 309). The value of −1 for the first item (Y in the step 309) means that no blocks are allocated to the file, so that the file control program 6 sets 1 (in use) for the open flag 22 of the file information area 11 and writes the number of the not-used block searched at the step 304 in the header item 23-1 of the allocated block list 23 (step 311). Such a condition that no blocks are allocated to the file, takes place when the user program 5 issues the file use end request without any data writing after issuance of the new file preparation request. The open flag 22 and allocated block list 23 are positioned close to each other in the external memory 2, and updating of two pieces of these information is realized through once writing to the external memory 2. After completing the step 311, the file control program 6 proceeds to a step 317. When the first item is not −1 (N in the step 309), the file control program 6 sets 1 (in use) for the open flag 22 of the file information area 11 (step 313). The file control program 6 next refers to the last block number 84 in the file information table 8 to find the number of last allocated one of the data-written blocks of the file required to be use-started by the user, and writes the block number already recorded in the temporarily allocated block number 85 of the file information table 8, i.e., the block number of the not-used block searched at the step 304 in the next block number information 101 of the found block (step 315). When the head item 23-1 of the allocated block list 23 is not −1 (N in the step 309), at least one block is allocated to the file, so that the last block number 84 has an effective number other than −1. The file control program 6 then updates the block allocation table 7 to change to 1 (in use) the status 72 of the not-used block found as a result of the searching operation of the step 304 (step 317), at which stage the file control program 6 terminates its operation.

After the aforementioned new file preparation request and file use start request are normally terminated, the open flags 82 and 22 for ones of files of the file information table 8 and file information area 11 corresponding to the new file preparation request or new file use start request of the user program 5 have each a value of 1 (in use). Also temporarily allocated to an end of the file is a single idle block having no data written therein separately from the data-written blocks for the next writing operation, and the number of the idle block is stored as the temporarily allocated block number 85.

Here is a processing procedure of the file control program 6 when the user program 5 issues a data read request to a file. When the file control program 6 knows through looking-up of the file information table 8 that the open flag 82 of the specified file is 1 (in use) and the deletion flag 86 is 0 (not during deletion), the file control program 6 refers to the allocated block list 83 to acquire a block number corresponding to the specified read position, reads the contents of the block having the acquired block number, and stores in the specified main memory the contents of the data information 103 in the read block contents. The file control program 6 then subtracts 1 from the number of read blocks. When the remaining block number is not 0, the file control program 6 adds 1 to the read position, again refers to the allocated block list 83 to acquire the next block number, and reads the contents of the block having the acquired block number. This procedure is repeated until the remaining number of blocks reaches 0, at which stage the file control program 6 terminates its operation.

Figure 7:
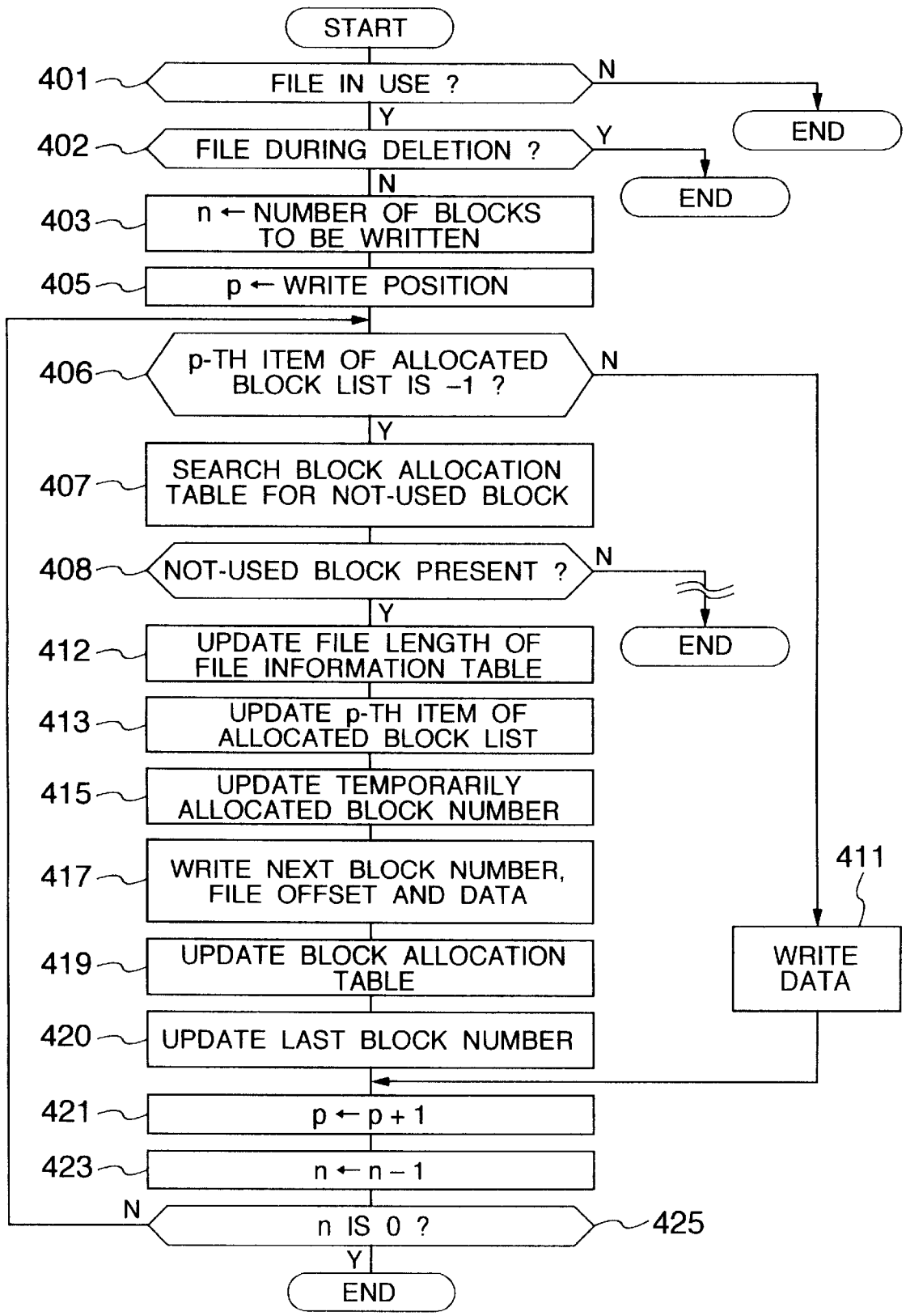
FIG. 7 is a flowchart for explaining a processing procedure of a data write request in the first embodiment.

FIG. 7 is a flowchart for explaining a processing procedure of the data write request for a file. In the present embodiment, it is assumed that, when the user program 5 issues the data write request, the program specifies a write start position in the file and the number of blocks for data writing. The file control program 6, when accepting the data write request to the file, refers to the open flag 82 within the file information table 8 to judge whether or not the file asked to write it by the user is in used (step 401). When the file is not in used (N in the step 401), this means when the user is going to write in such a file that its use start is not declared by the user, so the file control program 6 terminates its operation. Judgement of the file in use (Y in the step 401) causes the file control program 6 to refer to the deletion flag 86 in the file information table 8 to judge whether or not the file is during deletion (step 402). Judgement of the file during deletion (Y in the step 402) causes the file control program 6 to terminate its operation. When the file is not during deletion (N in the step 402), the file control program 6 substitutes the number of data-write blocks specified by the user into a variable n (step 403), and substitutes the data write position (relative block number) specified by the user program 5 into a variable p (step 405). The file control program 6 then judges whether or not the p-th item of the allocated block list 83 of the file information table 8 has a value of −1 (step 406). When the p-th item fails to have the value of −1 (N in the step 406), the file control program 6, knowing that this is an overwriting to an existing data block, writes the data specified by the user program 5 in the data information section 103 of the block having the block number stored as the p-th item of the allocated block list (step 411), and then proceeds to a step 421. When the p-th item has the value of −1 (Y in the step 406), this means when blocks are newly allocated to the file, so that the file control program 6 looks up the block allocation table 7 to search for a not-used block in the data area 13 of the external memory 2 (step 407). The file control program 6 next judges the presence or absence of a not-used block as a result of the searching operation of the step 407 (step 408). In the absence of a not-used block (N in the step 408), the file control program 6 terminates its operation. In the presence of a not-used block (Y in the step 408), the file control program 6 increments the file length 81 in the file information table 8 by an amount corresponding to one block (step 412). In the first embodiment, since new write data is always written in a block next to the last write position in the file, the file length increments whenever new data writing is carried out. Subsequently, the file control program 6 writes the block number stored at the temporarily allocated block number section 85 into the p-th item of the allocated block list 83 of the file of the file information table 8 to which the user asked to write it (step 413). The file control program 6 then writes as the temporarily allocated block number 85 the number of the not-used block found as a result of the searching operation of the step 407 (step 415). The file control program 6 writes the block number recorded in the temporarily allocated block number section 85 in the next block number information section 101 of the p-th block of the file, the value of the variable p in the file offset information section 102, and the data specified by the user in the data information section 103, respectively (step 417). In this connection, since the next block number information section 101, file offset information section 102 and data information section 103 are adjacent to each other on the external memory 2; writing of these 3 sections can be carried out through once writing operation to the external memory 2. Next, the file control program 6 updates the block allocation table 7 to set at 1 (in use) the status 72 found as a result of the searching operation of the step 407 (step 419). The file control program 6 then writes the block number written at the step 417 in the last block number section 84 of the file of the file information table 8 asked to write it by the user (step 420). The file control program 6 increments the value of the variable p indicative of a write position by 1 (step 421), and decrements the value of a variable n indicative of the remaining number of write blocks by 1 (step 423). The file control program 6 then judges whether or not the value of the variable n is 0 (step 425). When the value of the variable n is not 0 (N in the step 425), the file control program 6 returns to the step 407 to continue the operation. When the value of the variable n is 0 (Y in the step 425), the file control program 6 terminates its operation.

Figure 8:
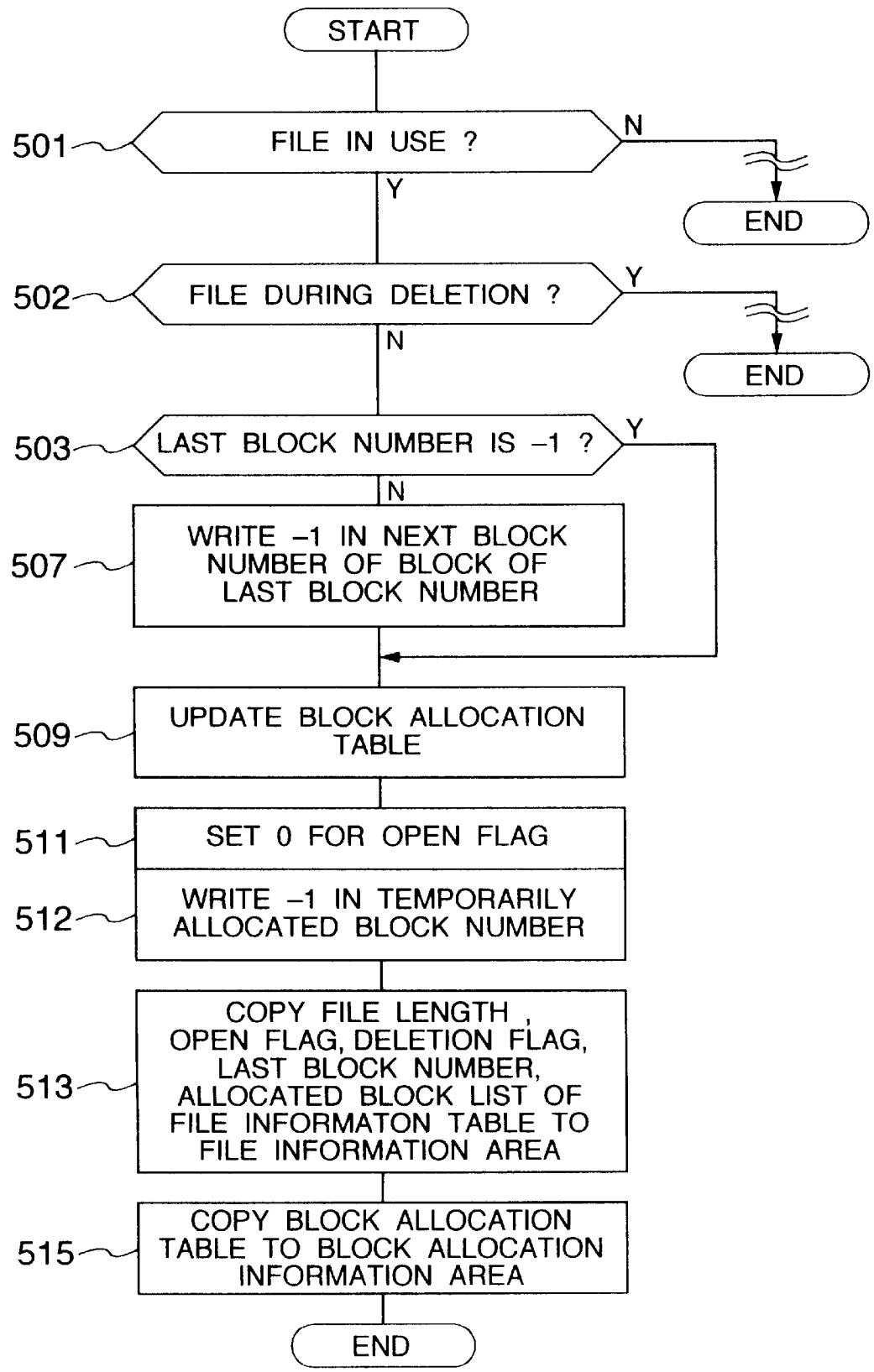
FIG. 8 is a flowchart for explaining a processing procedure of a file use end request in the first embodiment.

FIG. 8 is a flowchart for explaining a processing procedure of the file use end request. When receiving the file use end request, the file control program 6 refers to the open flag 82 of the file information table 8 to judge whether or not the file asked to terminate its use by the user is in use (step 501). Judgement of the file not in use (N in the step 501) causes the file control program 6 to terminates its operation, because the file use end request is to a file not in use. Judgement of the file in use (Y in the step 501) causes the file control program 6 to refer to the deletion flag 86 of the file information table 8 to judge whether or not the file is during deletion (step 502). Judgement of the file during deletion (Y in the step 502) causes the file control program 6 to terminate its operation. Judgement of the file not during deletion (N in the step 502) causes the file control program 6 to judge whether or not the last block number 84 of the file of the file information table 8 asked to terminate its use by the user is −1 (step 503). When the last block number 84 is −1 (Y in the step 503), this means to try to terminate use of a file not having data-written blocks, the file control program 6 proceeds to a step 509. When the last block number 84 is not −1 (N in the step 503), the file control program 6 writes −1 that is a value invalid as a block number in the next block number information section 101 of the block having the last block number 84 referred to at the step 503 (step 507). The file control program 6 then updates the block allocation table 7 to set at 0 (not in use) the status 72 of the block having the temporarily allocated block number 85 in the file of the file information table 8 asked to terminate its use by the user (step 509). Subsequently, the file control program 6 writes −1 as a value invalid as a block number in the temporarily allocated block number section 85, that is, releases the allocation of the temporarily allocated block (step 512). The file control program 6 copies the file length 81, open flag 82, deletion flag 86, allocated block list 83 and last block number 84 of the file of the file information table 8 asked to terminate its use by the user to the file length 21, open flag 22, deletion flag 26, allocated block list 23 and last block number 24 of the file information area 11 respectively (step 513); and also copies the block allocation table 7 to the block allocation information area 12 (step 515), at which stage the file control program 6 terminates its operation.

The above operation of the file use end request causes the open flags 82 and 22 to be set at 0 and also causes the block temporarily allocated to the end of the file and having no data written therein to be released.

Figure 9:
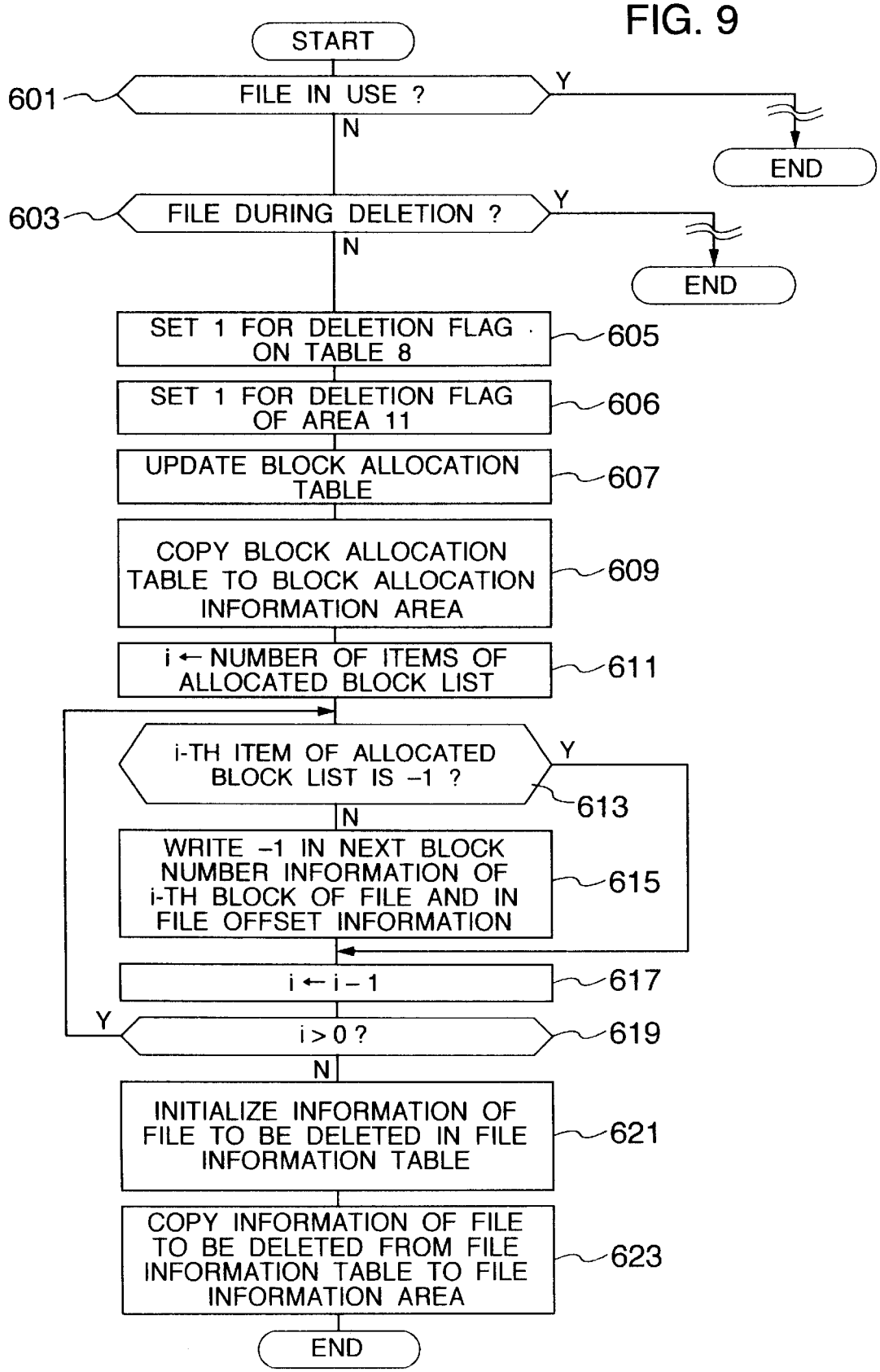
FIG. 9 is a flowchart for explaining a processing procedure of a file deletion request in the first embodiment.

FIG. 9 is a flowchart for explaining a processing procedure of the file deletion request. The file control program 6, when receiving the file deletion request, first refers to the open flag 82 in the file information table 8 to judge whether or not the file to be deleted is in used (step 601). When the file is in use (Y in the step 601), the file control program 6 terminates its operation. When the file is not in used (N in the step 601), the file control program 6 refers to the deletion flag 86 in the file information table 8 to judge whether or not the file to be deleted is already during deletion (step 603). When the file is during deletion (Y in the step 603), the file control program 6 terminates its operation. When the file is not during deletion (N in the step 603), the file control program 6 sets the deletion flag 86 of the file information table 8 at 1 (during deletion) (step 605) and sets the deletion flag 26 of the file information area 11 at 1 (during deletion) (step 606). The file control program 6 next refers to the allocated block list 83 in the file information table 8 to set the allocation information 72 of the block allocation table 7 at 0 (not used) with respect to all the block (step 607), and copies the contents of the block allocation table 7 to the block allocation information area 12 (step 609). The file control program 6 then substitutes the number of items of the allocated block list 83 of the file information table 8 into the variable i (step 611) to judge whether or not the i-th item of the allocated block list 83 has a value of −1 (indicative of the fact that no blocks are allocated to the file) (step 613). When the i-th item has not the value of −1 (N in the step 613), a block is allocated to the i-th position of the file, so that the file control program 6 refers to the allocated block list 83 to set a value of −1 for the next block number information 101 of the block allocated to the i-th position of the file and to write a value of −1 in the file offset information section 102 (step 615), and the proceeds to a step 617. When the i-th item has a value of −1 (Y in the step 613), the file control program 6 subtracts the value of the variable i by 1 (step 617). After this, the file control program 6 judges whether or not the value of the variable i is larger than 0 (step 619), so that, when the variable value is larger than 0 (Y in the step 619), the file control program 6 returns to the step 613 to continue its operation. When the variable value is 0 (N in the step 619), this means completion of the operations of all items of the allocated block list 83. Thus, the file control program 6 blanks the file name 80 corresponding to the file to be deleted in the file information table 8, initializes or sets the file length 81 at 0, the deletion flag 86 at 0, all items of the allocated block list 83 at −1, the last block number 84 at −1, the temporarily allocated block number 85 at −1 (step 621); and copies the part of the file information table 8 updated at the step 621 to the file information area 11 (step 623), thus terminating its operation.

After the procedures of the above new file preparation request, file use start request, file write request and file use end request are followed, a single blank block is temporarily allocated to the newly-prepared file and for the file whose use start was declared, and its block number is stored in the file information table 8 as the temporarily allocated block number 85. When it is desired to write data in a file, the file control program 6 updates the contents of the existing blocks in the overwrite mode to the existing data, and, in a new block addition mode to the file, writes the data in a temporarily allocated block and at the same time, temporarily allocates the new block to the file and writes it in the next block number information section 101 of the block newly added to the file. This enables formation of a reference relationship based on the next block number information 101 between the blocks allocated to the file. In the examples of FIGS. 2 and 4, such writing operations are sequentially carried out as the fact that the file XXX is made up of the blocks of the block numbers 1, 3 and 4, is recorded in the file information table 8. The head item 23-1 (the block number 1) of the allocated block list 23 is written in the external memory 2 when a new file is created. Further, the block allocated next to the head item having the block number 1 (the block number 3), the block allocated next to the item having the block number 3 (the block number 4), etc. are sequentially recorded in the next block number information 101. Thus the file control program 6 can follow the blocks allocated to the file from the head to end of the file by referring to the values of the next block number information section 101. In this example, a blank block having no data written therein is temporarily allocated to the end of the file. Since the blank block has a value of −1 in the next block number information 101, the block can be judged to be the end of the file. In other words, the contents of the file information table 8 can be restored on the basis of the contents written in the external memory 2. Further, since the next block number information 101 and file offset information 102 are written in the external memory 2 as added to the data information 103, the number of writing operations to the external memory 2 will not be increased when compared to a UNIX system or the like system. That is, overhead will not be substantially increased. When the file information table 8 is restored for all the files stored in the external memory 2, the contents of the block allocation table 7 and block allocation information area 12 can also be restored.

Figure 10:
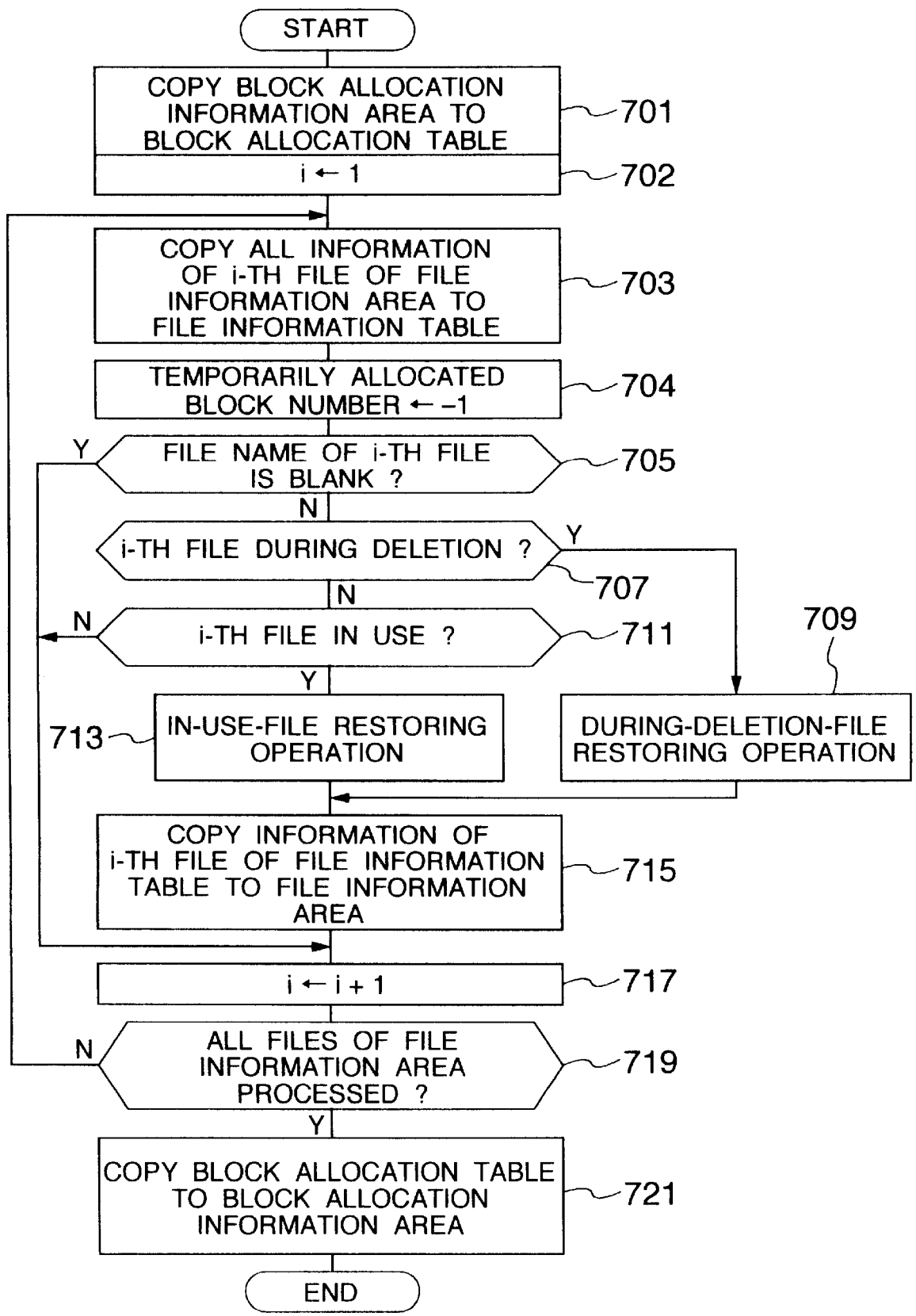
FIG. 10 is a flowchart for schematically explaining a processing procedure of a file information restoring operation in the first embodiment.

FIG. 10 is a flowchart for explaining a processing procedure of the file information restoring operation of the file control program 6 which, after a failure took place in the computer 1 during use or deletion of a file, restores the contents of the file information table 8 and block allocation table 7 from the file information area 11 and data area 13 recorded in the external memory 2 to thereby restore the contents of the file information area 11 and block allocation information area 12.

The file information restoring operation is carried out by the user, after a failure occurred in the computer 1, i.e., under a condition that the contents of the file information area 11 were lost. When a file is in use at the failure occurrence time in the computer 1, the contents of the file information table 8 and block allocation table 7 written in the external memory 2 from the main memory of the computer 1 in response to the file use end request will not reflect on the file information area 11 and block allocation information area 12.

When the file information restoring operation is called, the file control program 6 copies the contents of the block allocation information area 12 to the block allocation table 7 on the main memory (step 701), and substitutes 1 into the variable i (step 702). The file control program 6 then copies the i-th file name 20, file length 21, open flag 22, deletion flag 26, allocated block list 23 and last block number 24 recorded in the file information area 11 to the file name 80, file length 81, open flag 82, deletion flag 86, allocated block list 83 and last block number 84 of the file information table 8 in the main memory (step 703). The file control program 6 next stores −1 in the temporarily allocated block number section 85 (step 704). The file control program 6 judges whether or not the file name 80 of the copied i-th file is blank (step 705). When the file name 80 is blank (Y in the step 705), this means there is no i-th file and thus the file control program 6 proceeds to a step 717. When the file name 80 is not blank (N in the step 705), the file control program 6 refers to the deletion flag 86 to judge whether or not the file is during deletion at the failure occurrence time in the computer 1 (step 707). When the file is during deletion (Y in the step 707), the file control program 6 performs its during-deletion-file restoring operation to restore the contents of the block allocation table 7 and file information table 8 (step 709). When the file is not during deletion (N in the step 707), the file control program 6 refers to the open flag 82 to judge whether or not the file was in use at the failure occurrence time in the computer 1 (step 711). When the file is not in use (N in the step 711), the file control program 6 goes to a step 717. That is, when the file is not in use nor during deletion at the failure occurrence time in the computer 1, the file name 80, file length 81, open flag 82, deletion flag 86 and last block number 84 of the i-th file in the file information table 8 at the time of the failure occurrence in the computer are equal to the file name 20, file length 21, open flag 22, deletion flag 26 and last block number 24 of the i-th file of the file information area 11. Therefore, only copying of the information of the file information area 11 to the file information table 8 causes completion of the restoring operation. When the file is in use (Y in the step 711), the file control program 6 performs its in-use-file restoring operation to restore the contents of the block allocation table 7 and file information table 8 (step 713). When completing the in-use-file restoring operation of the step 713 and the during-deletion-file restoring operation of the step 709, the file control program 6 copies the file name 80, file length 81, open flag 82, deletion flag 86 and last block number 84 of the i-th file in the file information table 8 to the file name 20, file length 21, open flag 22, deletion flag 26 and last block number 24 of the file information area 11 on the external memory 2 (step 715). Next, the file control program 6 adds 1 to the value of the variable i (step 717) to judge whether or not the operation has been completed over all the files of the file information area 11, i.e., whether or not the value of the variable i exceeds the end of the file information area 11 (step 719). When the operation has not been completed yet for all the files (N in the step 719), the file control program 6 returns to the step 703 to continue the operation. When the operation has been completed for all the files (Y in the step 719), this means the completion of all the files to be controlled by the file information area 11, whereby the file control program 6 copies the contents of the block allocation table 7 restored at the steps 713 and 709 to the block allocation information area 12 (step 721), thus completing the operation.

Through the aforementioned operations, the file control program 6 can perform the in-use-file restoring operation (step 713) or the during-deletion-file restoring operation (step 709) over only the file in use or during deletion at the time of the failure occurrence in the computer 1 among all the files to be controlled by the file information area 11, can perform the restoring operation over the other files not in use nor during deletion at the failure occurrence time in the computer 1 only by copying the information of the file information area 11 to the file information table 8, which results in that the same condition as at the time of no failure in the computer 1 can be achieved for the user.

Figure 11:
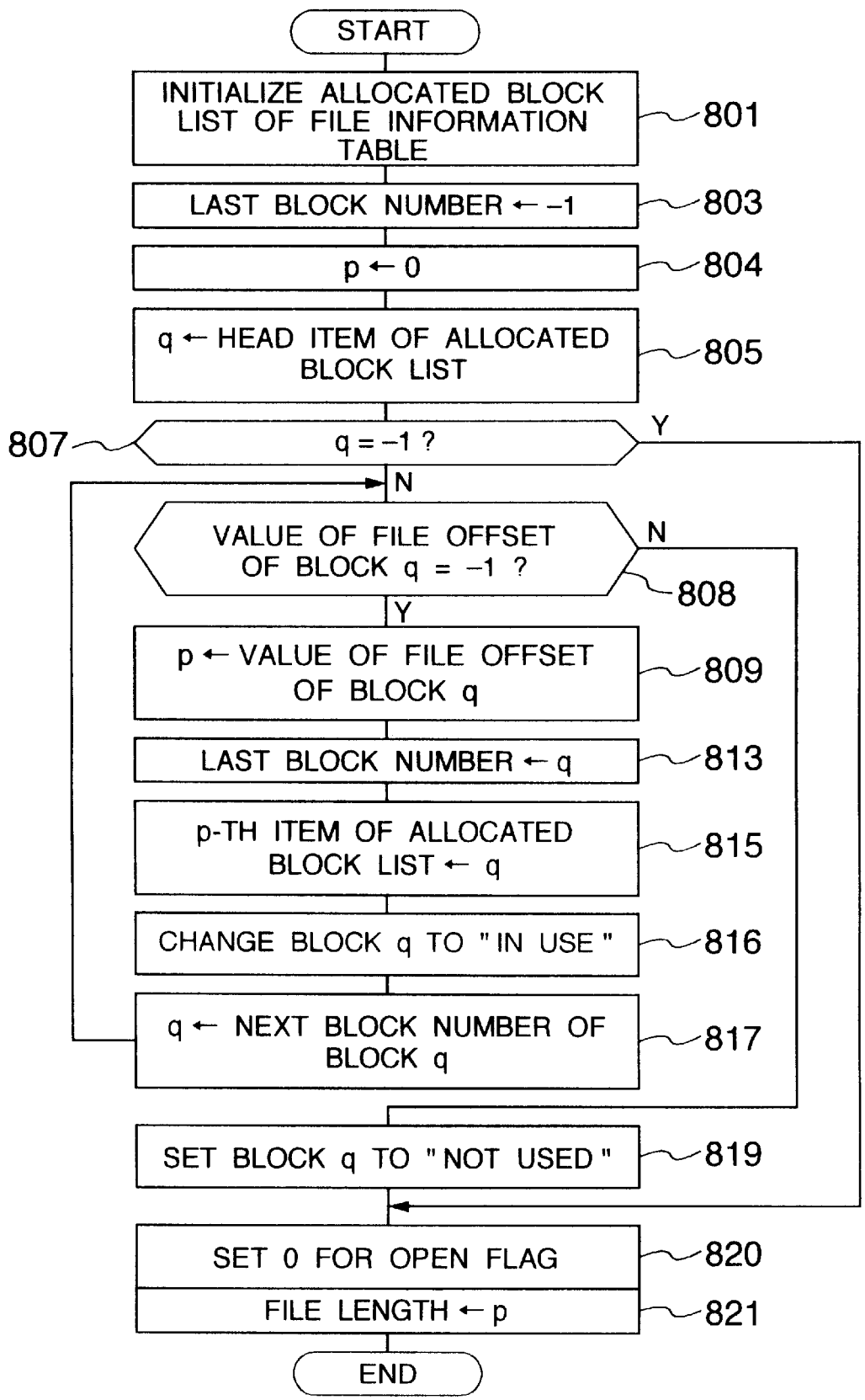
FIG. 11 is a flowchart for explaining a processing procedure of a file-in-use restoring operation in the file information restoring operation in the first embodiment.

FIG. 11 is a flowchart for explaining a processing procedure of the in-use-file restoring operation of the step 713. The file control program 6 first writes −1 in all the items of the allocated block list 83 for the i-th file in the file information table 8 (step 801). The file control program 6 then writes −1 in the last block number section 84 of the i-th file (step 803), substitutes 0 into the variable p (step 804), and substitutes into the variable q the value of −1 for the head item 23-1 of the allocated block list 23 of the i-th file (step 805). Thereafter, the file control program 6 judges whether or not the value of the variable q is −1 (step 807). When the value of the variable q is −1 (Y in the step 807), the file control program 6 can know that no single block is allocated to the file, the file control program 6 proceeds to a step 820. When the value of the variable q is not −1 (N in the step 807), the file control program 6 judges whether or not the value of the file offset information 102 of the block having the block number q is −1 (step 808). When the value of the file offset information 102 is −1 (Y in the step 808), the file control program 6 can know that the block having the block number q is temporarily allocated or has data not written therein yet and thus that there is no other block in the currently processing file, the file control program 6 proceeds to a step 819. When the value of the file offset information 102 is not −1 (N in the step 808), the file control program 6 substitutes into the variable p the value of the file offset information 102 of the block having the block number q (step 809), and substitutes the value of the variable q into the last block number 84 of the i-th file (step 813). The file control program 6 then substitutes the value of the variable q into the p-th item of the allocated block list (step 815), sets at 1 (in use) the allocation information 72 of the block having the block number q in the block allocation table 7 (step 816), substitutes into the variable q the value of the next block number information 101 of the block having the block number q (step 817), and then returns to the step 808 to continue the operation. Subsequently, the file control program 6 sets at 0 (non-use) the allocation information 72 of the block having the block number q in the block allocation table 7 for the i-th file (step 819), and sets the open flag 82 at 0 (step 820). The file control program 6 finally substitutes the value of the variable p for the file length 81 (step 821), thus terminating the operation.

Through the aforementioned operations, the file control program 6 can restore the contents of the file information table 8, by referring the next block number information 101 of each of the blocks allocated to the file in use at the failure occurrence time of the computer 1 to sequentially follow the blocks starting with the block allocated to the head of the file and ending in the block having no data written therein.

With respect to the file which was in use at the time of the failure occurrence of the computer 1, when the failure occurred in the computer 1 prior to writing of the next block number information 101, file offset information 102 and data information 103 of the block of the p-th write position at the step 417; the restoring operation of the file information table 8 is already finished for the blocks up to the (p−1)-th write position, so that, when the user program 5 asks a data write request from the p-th block, the above operation can be resumed. When the failure occurred in the computer 1 after completion of the writing operation of the block of the p-th write position, since the restoring operation of the file information table 8 is already finished for the blocks of up to the p-th write position, so that the user program 5 can continue the operation when a data write request of the next and subsequent blocks is asked. In either case, the allocation of the temporarily allocated blocks is released and the file information table 8 is restored to the file use end condition, so that the file control program 6 can restart the operation from the new file preparation request or file use start request.

Figure 12:
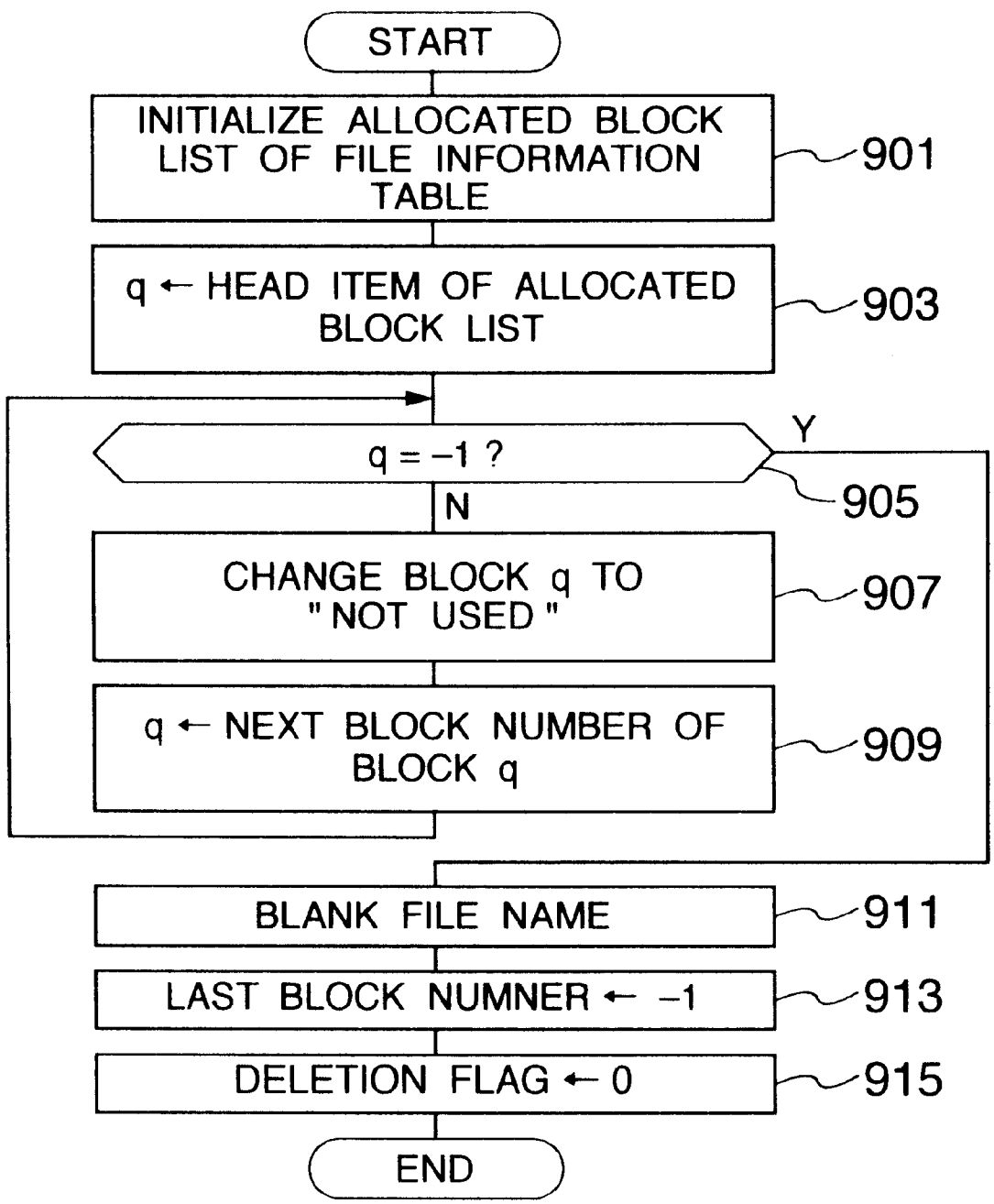
FIG. 12 is a flowchart for explaining a processing procedure of a during-deletion-file restoring operation in the file information restoring operation in the first embodiment.

FIG. 12 is a flowchart for explaining a processing procedure of the during-deletion-file restoring operation of the step 709. The file control program 6 first substitutes −1 into all the items of the allocated block list 83 corresponding to the i-th file (step 901). The file control program 6 then substitutes into the variable q the value of the head item 23-1 of the allocated block list 23 of the i-th file (step 903). The file control program 6 judges whether or not the value of the variable q has a value of −1 (step 905). When the value of the variable q has a value of −1 (Y in the step 905), the file control program 6 can see that the operation has been completed for all the blocks in the i-th file, and accordingly the file control program 6 proceeds to a step 911. When the value of the variable q has not a value of −1 (N in the step 905), the file control program 6 sets at 0 (non-use) the status 72 of the block allocation table 7 for the block having the block number q (step 907), substitutes into the variable q the value of the next block number information 101 of the block having the block number q (step 909), and then returns to the step 905 to continue the operation. After this, the file control program 6 blanks the file name 80 corresponding to the i-th file in the file information table 8 to set at 0 the file length of the i-th file of the file information table 8 (step 911). Next, the file control program 6 substitutes −1 for the last block number 84 (step 913), sets the deletion flag 86 of the i-th file at 0 (step 915), at which stage file control program 6 terminates its operation.

Through the aforementioned processing procedure, the file control program 6 completes the file deletion request for the file which was during deletion at the time of the failure occurrence of the computer 1 to thereby put the file in its deleted state.

In the first embodiment, after the completion of operation of the new file preparation request or file use start request, the heading data block of the file located in the data area 13 or the block number of a non-use block are necessarily recorded in the header item of the allocated block list 23 of the external memory 2. The subsequent blocks starting with the block of the block number specified by the first item of the allocated block list 23 are sequentially recorded in the data area 13 as chained by the next block number information 101, the file terminates a not-used block. And even when a failure takes place in the computer 1 at any time point of the data write operation, the header item of the allocated block list 23 and the not-used block as the end of the file are saved. When a failure took placed during the data write operation, the flag of 1 (in use) is saved in the open flag 22 of the external memory 2. Accordingly, by tracing the blocks of the next block number information 101 sequentially starting with the block of the block number specified by the head item of the allocated block list 23 with respect to the file having the open flag 22 indicative of "in use", the file control program 6 can reach the not-used block provided at the end of the file and thus can restore the contents of the file information table 8 with respect to the file in question. It will also be appreciated from the above explanation that the file control program 6 also can restore the contents of the block allocation table 7. The restoration of the block allocation table 7 causes the not-used block allocated at the time point of the data write operation to be released, so that the file control program 6 can restart the operation from the new file preparation request or file use start request. Since the next block number information 101 necessary for the file restoration is written simultaneously with attaching to the data of the data information 103 required by the user program 5, the number of writing operations to the external memory 2 will not be increased and therefore overhead will not be substantially increased.

In the first embodiment, the user program 5, whenever issuing the file use start request, changes the open flags 22 and 82 always to 1 (in use) and newly performs the operation of allocating a new idle block to the end of the file. However, when it is desired to receive a flag indicative of "exclusive reading operation" as a parameter of the file use start request to start use of the file for exclusive reading operation, the user program 5 omits the operation of allocating the idle block and holds the open flags 22 and 82 at 0, whereby overhead of allocating the unnecessary idle block can be eliminated and such an embodiment can be possible that, at the time of a failure occurrence of the computer 1, the file is excluded as the file to be subjected to the in-use-file restoring operation of the step 713. In this case, the file use terminating operation ends without any operation because the file is not in use.

In the first embodiment, the last block number 84 is used to make fast access to the last block when the file control program 6 writes −1 in the file offset information section 102 of the last block to release the temporarily allocated block at the time of the file use completion to thereby separate the temporarily allocated block from the end of the file, and the last block number 84 is not specifically required in the restoring operation. Since the items of the allocated block list 83 are traced so that the last block has such a last block number as not to be −1, if the allocated block list 83 is present, then the present invention can be carried out even when the last block number 84 is not provided. In the first embodiment, further, the file offset information 102 is provided for each of the blocks on the data area 13, which information is used when it is desired in the restoring operation to access the item corresponding to the allocated block list 83 from the file offset. However, in the case where the block of the block number indicated by the head item of the allocated block list 23 starts with the block having the file offset (relative block number) 1 and the order of the subsequent blocks to be sequentially chained by the next block number information 101 corresponds to the file offset, when the next block number information 101 is traced to access the next block, an increment of the file offset by 1 enables easy calculation of the file offset, for which reason the file offset information 102 becomes unnecessary. In this way, judgement of whether or not the block is a temporarily allocated block in the absence of the file offset information 102 can be carried out on the basis of whether or not the value of the next block number information 101 is a specific identifier such as, for example, −1; or can be carried out on the basis of judgement of a flag (identifier) provided separately from the next block number information 101 to indicate whether or not the block is a temporarily allocated block.

(2) Second Embodiment

Explanation will be made as to a second embodiment of the present invention and be focused on only a part of the second embodiment different from the first embodiment. The present embodiment is featured by suppressing an increase in the overhead when data is written in a file, by enabling restoration of the file information even when a failure occurred in the computer 1, by automatically updating the file version whenever the user program 5 declares the use start of the file, and by always allocating a new block even when overwriting is carried out to the file data to thereby restore the file to the version condition specified by the user. In the present embodiment, a new block is allocated even in the data overwriting operation to thereby increase the number of blocks to be used. However, when the file control program 6 performs the operation of releasing the overwritten block each time the user program 5 issues the file use end request, with the result that the number of blocks to be used can be suppressed to nearly the same block number as in the first embodiment. The released already-overwritten block is used not only when the file of the old version is restored through the specification of the user program 5, but also when the released block is allocated to another file because any block is present no longer in the data area 13.

The system configuration of FIG. 1 can be applied even to the second embodiment. As will be explained in detail, the second embodiment is different from the first embodiment in that the, but the same reference numerals as in the first embodiment are used even in the second embodiment. Accordingly, when these constituent elements are referred to with their reference numerals, these refer to the constituent elements of the second embodiment when not specifically specified herein.

FIG. 13A shows an exemplary data format of the file information table 8. When compared with the items of the file information table 8; a file ID 87, a version 88, a file status 89, an overwritten block list 90 and a next block number table memory area 95 are added or modified. The file ID 87 is a unique number allocated to each prepared file. The version 88 has a value incremented by 1 each time the user program 5 issues the file use start request and file use end request. The user program 5, when specifying a version of the file, can read out the contents of the file of the version, so long as the block having the data of the specified version stored therein is not allocated to another file. The file status 89 has a value indicative of a file status, that is, "not used", "in use", "releasing overwritten block", "saved" or "deleted". "Not used" indicates a status in which a file information is not present in the corresponding item of the file information table 8; "in use" indicates a status in which the user program 5 issues the file use start request and the file is being used; "releasing overwritten block" indicates a status in which the user program 5 issues the file use end request and the block so far overwritten is being released"; "saved" indicates a status in which the file use end request is completed; and "deleted" indicates a status in which the file is already deleted.

When completing the operation of the file use end request, the file control program 6 shifts the file status 89 from the "releasing overwritten block" to "saved" in the presence of an overwritten block; whereas, the file control program 6 shifts the file status 89 from "in use" to "saved" in the absence of an overwritten block. When completing the file deleting operation, the file control program 6 shifts the file status 89 from "saved" to "deleted". When performing the file use starting operation, the file control program 6 shifts the file status 89 from "saved" to "in use". An issuance of the new file preparation request causes the file status 89 to be shifted from "not used" to "in use". In this connection, when there is no row of "not used" in the file information table 8, the file control program 6 can change a row of "deleted" to the row of "in use" to use it. The overwritten block list 90 is a list having a block number of a data-overwritten block. The next block number table memory area 95 stores therein a next block number table 96 which is a copy of the next block number table stored in a next block number table information 104 of the block of the block number stored in the last block number 84. The next block number table 96 shows a relationship between a version 97 of a file when data is written in the block of the block number stored in the last block number 84 and a next block number 98 indicative of the block number of the next block when the data is written.

FIG. 13B shows a data format of the file information area 11. When compared with the items of the file information area 11 in the first embodiment, a file ID 27, a version 28, a file status 29 and a head block number table 30 are added or modified. The file ID 27, version 28 and file status 29 have the same meanings as the file ID 87, version 88 and file status 89, respectively. The head block number table 30 shows a relationship between a version 91 of a file when the head block of the file is allocated and a head block number 92 of the file of the associated version.

FIG. 14A shows an exemplary data format of the block allocation table 7. The status 72 takes 3 statuses of "not used", "in used" and "overwritten". "Not used" indicates a status in which a block is not allocated to a file yet even once or a block is allocated to a file and then released by the file deletion; "in use" indicates a status in which a block is already allocated to a file; and "overwritten" indicates a status in which a block is already allocated to a file and its contents is old by the overwriting.

FIG. 14B shows an exemplary data format of the block allocation information area 12. The block allocation information area 12 is a copy of the block allocation table 7.

FIG. 15 shows an exemplary data format of the data area 13. When compared with the items of the data area 13 in the first embodiment, a next block number table information 104, a file ID information 105 and a block status information 106 are added or modified. The next block number table information 104 shows a relationship between a version of a file when data is written in the associated block and a next block number indicative of the block number of a block positioned next to the block in question in the file at that time point. The file ID information section 105 records therein the file ID 87 to which the block in question is allocated. The block status information section 106 stores therein a value as the status of the block in question, indicative of any one of "not used", "in use" and "overwritten", which statuses have the same meanings as those of the allocation information 72 of the block allocation table 7.

Figure 16:
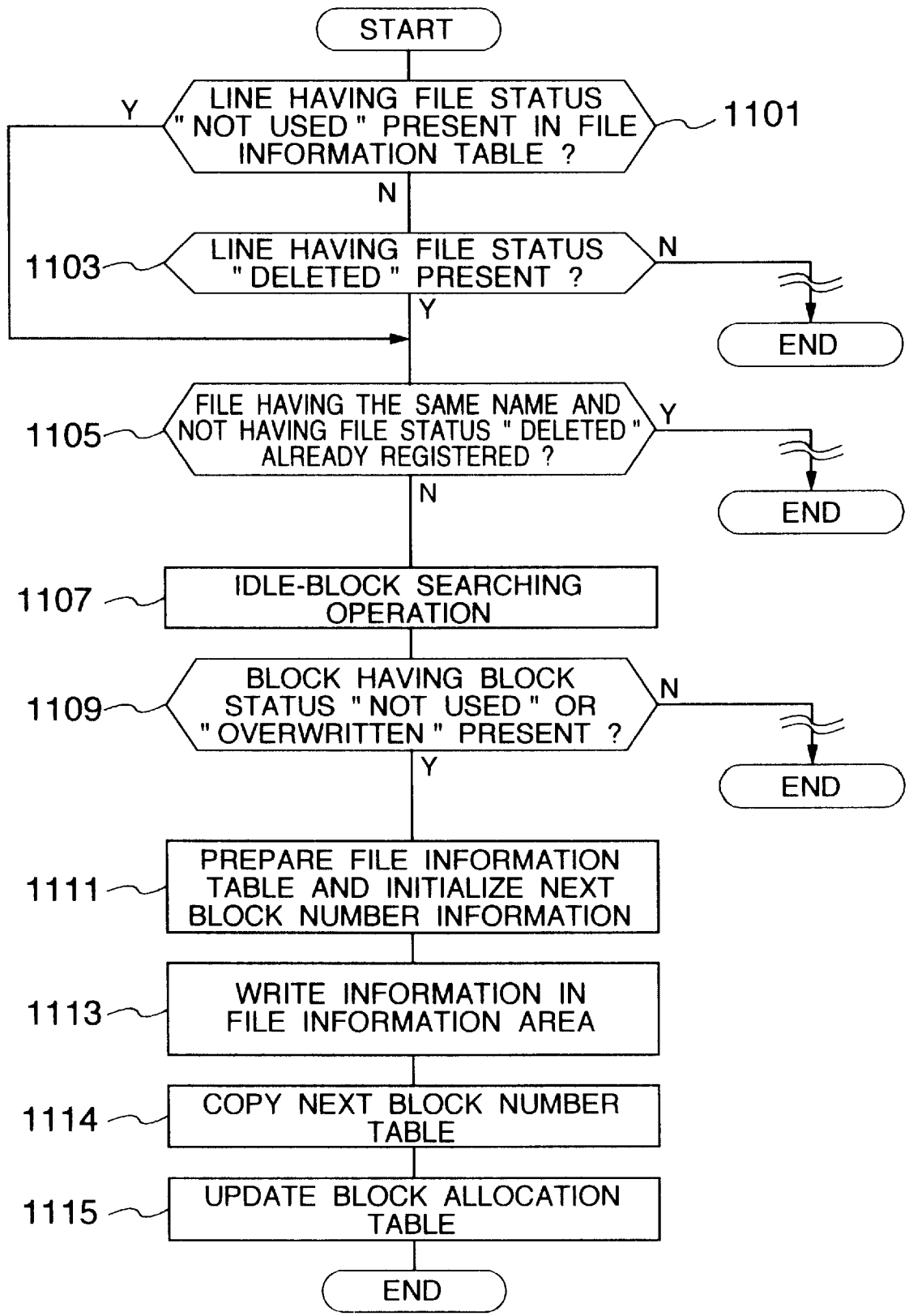
FIG. 16 is a flowchart for explaining a processing procedure of a file new preparation request in the second embodiment.

FIG. 16 is a flowchart for explaining a processing procedure of the new file preparing operation in the present embodiment. When receiving the new file preparation request, the file control program 6 judges whether or not there is a row having "not used" of the file status 29 in the file information area 11 (step 1101). When there is no row of "not used" (N in the step 1101), the file control program 6 judges whether or not there is a row of "deleted" of the file status 29 in the file information area 11 (step 1103). In the absence of a row of "deleted" (N in the step 1103), the file control program 6, knowing that there is no row usable for a file to be newly prepared in the file information area 11, terminates its operation. In the presence of a row of "not used" (Y in the step 1101) or a row of "deleted" (Y in the step 1103), the file control program 6 judges whether or not there is a file which has the same file name 20 of the file to be newly prepared and there is a row of not "deleted" of the file status 29 in the file information area 11 (step 1105). When there is a file having the same file name (Y in the step 1105), this means that a file to be newly prepared is already present, the file control program 6 terminates its operation. When there is no file having the same file name (N in the step 1105), the file control program 6 performs idle block searching operation (step 1107) to judge a usable block (of "not used" or "overwritten") is present as a result of the searching operation (step 1109). When there is not usable block (N in the step 1109), this means that a writable block is not present and accordingly the file control program 6 cannot write data in a newly prepared file, the file control program 6 terminates its operation. When there is a usable bloc (Y in the step 1109), the file control program 6 prepares the file information table 8 (step 1111). That is, the file control program 6 initializes the file information table 8; i.e., writes a file name specified by the user program 5 as the file name 80, a uniquely distinguishable value as the file ID 87, 0 as the file length 81, 0 as the version 88, "in use" as the file status 89, the number of a block found as a result of the searching operation of the step 1107 as the temporarily allocated block number 85, −1 invalid as the block number of the last block number 84, −1 in the version section 97 for all the items of the next block number table 96 recorded in the next block number table memory, area 95, and −1 as the next block number 98. Thereafter, the file control program 6 copies the file name 20, file ID 27, file length 21, version 28, file status 29 and last block number 24 of the file information area 11 to the file name 80, file ID 87, file length 81, version 88, file status 89 and last block number 84 of the file information table 8; and at the same time, adds the version 88 of the file information table 8 to the version 91, an item having the number of a block found through the idle-block searching operation of the step 1107 as the head block number 92, as new items of the head block number table 30 (step 1113). At the step 1113, the data to be written in the file information area 11 are all located adjacent to each other on the external memory 2, and thus the file control program 6 can write the data in the external memory 2 through once output operation thereto. Subsequently, the file control program 6 copies the next block number table 96 stored in the next block number table memory area 95 to the next block number table of the next block number table information 104 of the block found through the idle-block searching operation of the step 1107 (step 1114). The file control program 6 then updates the block allocation table 7 to change the allocation information 72 found at the step 1107 to "in use" (step 1115).

Through the above procedure, the file control program 6, in response to the request from the user program 5, prepares information on the new file and writes it in the file information table 8 and file information area 11. Temporarily allocated to the newly prepared file is the block having no data written therein so that the number of the block is recorded as the temporarily allocated block number 85 of the file information table 8 and as the head block number 92 of an item newly prepared in the head block number table 30 of the file information area 11.

Figure 17:
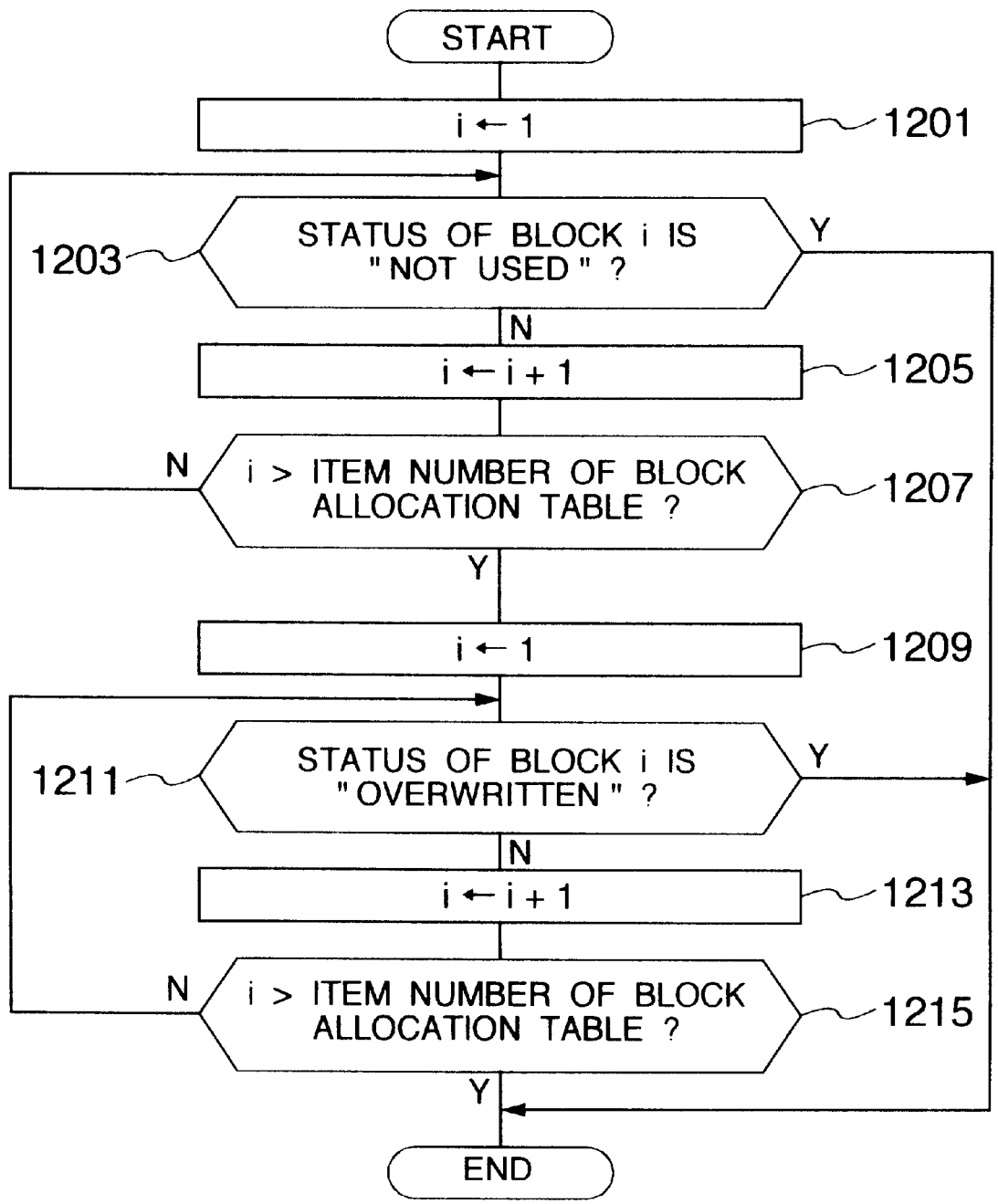
FIG. 17 is a flowchart for explaining a processing procedure of an idle block searching operation in the second embodiment.

FIG. 17 is a flowchart for explaining a processing procedure of the idle-block searching operation of the step 1107. The idle-block searching operation is to search for a block in which data can be newly written. The file control program 6 first substitutes 1 for the variable i (step 1201). The file control program 6 then judges whether or not the allocation information 72 of the block having the block number i is "not used" by looking up the block allocation table 7 (step 1203). In the case of "not used" (Y in the step 1203), the file control program 6, knowing that there is present a block in which data can be newly written, terminates its operation. In the case of not "not used" (N in the step 1203), the file control program 6 adds 1 to the value of the variable i at the step 1205, and judges the value of the variable i is larger than the number of blocks controlled by the block allocation table 7 (step 1207). When the variable i is not larger than the number of blocks (N in the step 1207), the file control program 6 returns to the step 1203 to continue the operation. When the variable i is larger than the number of blocks (Y in the step 1207), the file control program 6 can know that there is no block whose status is "not used", and thus performs searching operation for a block whose status is "overwritten". The file control program 6 first substitutes 1 into the variable i (step 1209). The file control program 6 then judges whether or not the allocation information 72 of the block having the block number i is "overwritten" by looking up the block allocation table 7 (step 1211). In the case of "overwritten" (Y in the step 1211), the file control program 6 can know that there is present a block in which data can be newly written and thus terminates its operation. In the case of not "overwritten" (N in the step 1211), the file control program 6 adds 1 to the value of the variable i (step 1213), and judges whether or not the value of the variable i is larger than the number of blocks controlled by the block allocation table 7 (step 1215). When the variable i is not larger than the number of blocks (N in the step 1215), the file control program 6 returns to the step 1211 to continue the operation. When the variable i is larger than the number of blocks (Y in the step 1215), the file control program 6 can know that there is not present a block in which data can be newly written, and thus terminates its operation.

Through the above processing procedure, when there is present a block whose status is "not used", the block is found through the searching operation. In this connection, only when there is not present a block whose status is "not used", a block of "overwritten" can be searched. In the present embodiment, there may exist such a situation that, when a file is restored to its old version, a block whose status is "overwritten" is referred to. For this reason, so long as there is present a block whose status is "not used", the file control program 6 not newly writes data in the block of the status "overwritten" but uses the block of the status "not used".

In the present embodiment, at the time of searching for a block of the status "overwritten", the file control program 6 sequentially searches for it in the order of the items of the block allocation table 7 and uses the first-found idle block as a data writing block. However, such an embodiment is also possible that the file control program 6 writes a time at which data was written in the block simultaneously with the block allocation status, etc. and writes them in the block allocation table 7 and block allocation information area 12, whereby, at the time of searching for a block of the status "overwritten" in the idle-block searching operation, the file control program 6 compares the data-written times and selects one of the blocks having the oldest data-written time.

Figure 18:
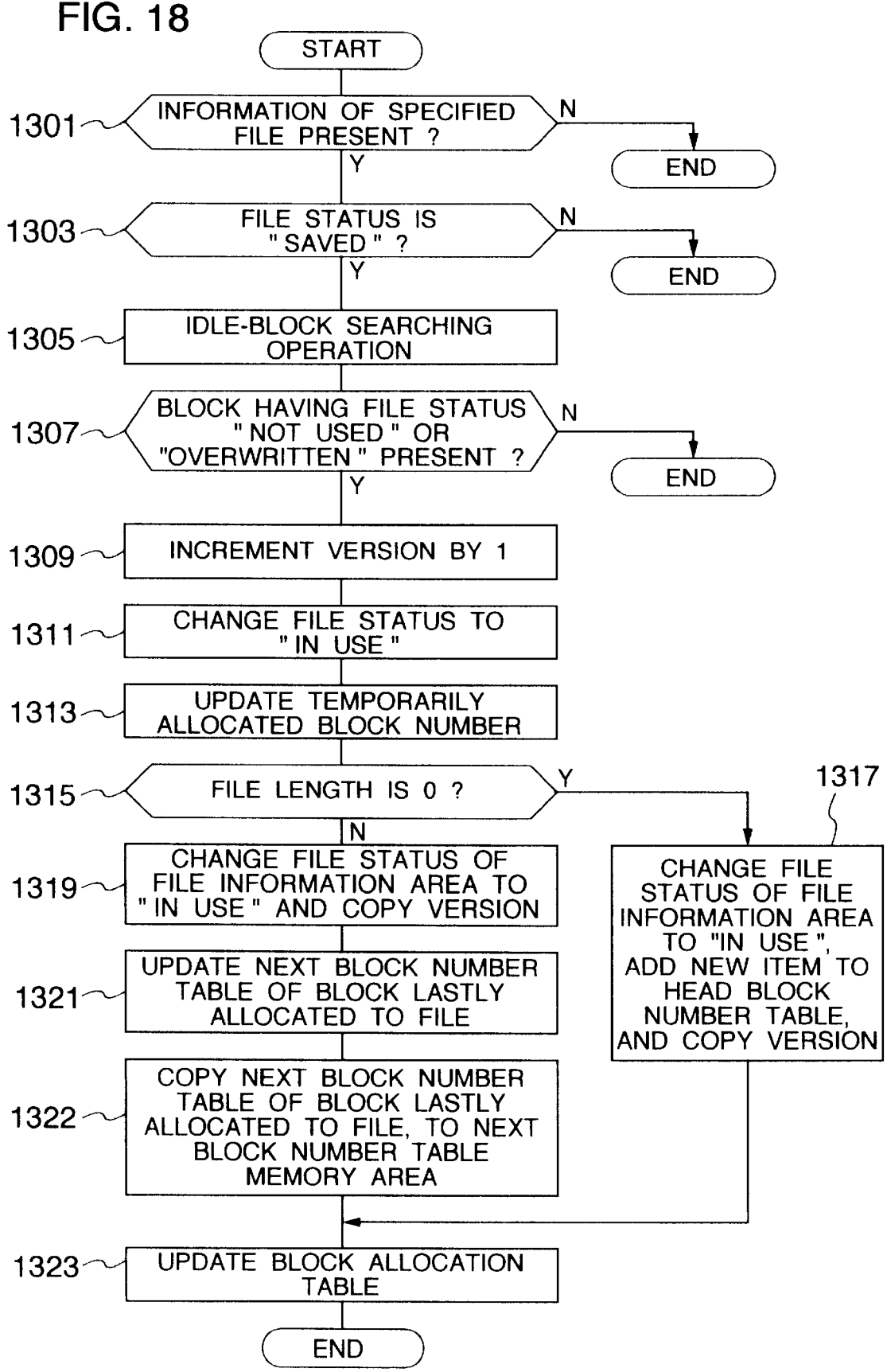
FIG. 18 is a flowchart for explaining a processing procedure of a file use start request in the second embodiment.

FIG. 18 is a flowchart for explaining a processing procedure of the file use start request in the present embodiment. When receiving the file use start request, the file control program 6, first of all, judges whether or not the information of the file requested to start its use by the user program 5 is already registered by looking up the file information table 8 (step 1301). When the file information is not registered (N in the step 1301), this means the file use start request is for a file not present, and thus the file control program 6 terminates its operation. When there is not present a file asked to start its use by the user program 5, the file control program 6 may perform the new file preparing operation in place of terminating its operation. When the file information is registered (Y in the step 1301), the file control program 6 judges whether or not the file status 89 is "saved" (step 1303). When the file status 89 is not "saved" (N in the step 1303), the file control program 6 terminates its operation. In the case of "saved" (Y in the step 1303), the file control program 6 executes its idle-block searching operation (step 1305). The idle-block searching operation is the same as the operation explained in connection with FIG. 17. On the basis of a result of the idle-block searching operation of the step 1305, the file control program 6 judges whether or not there is present an idle block in which data can be written, i.e., a block which allocation information 72 is "not used" or "overwritten" (step 1307). In the absence of an idle block (N in the step 307), the file control program 6 terminates its operation. In the presence of an idle block (Y in the step 1307), the file control program 6 adds 1 to the value of the version 88 of the file stored in the file information table 8 (step 1309). Thereafter, the file control program 6 changes the file status 89 stored in the file information table 8 to "in use" (step 1311), and writes the number of the idle block found as a result of the idle-block searching operation of the step 1305 as the temporarily allocated block number 85 (step 1313). The file control program 6 then judges whether or not the file length 81 stored in the file information table 8 is 0 (step 1315). When the file length is 0 (Y in the step 1315), this is a use start request to a file whose blocks are not allocated at all. Thus, the file control program 6 copies the file status 89 and version 88 of the file information table 8 to the file status 29 and version 28 of the file information area 11 adds to the head block number table 30 as new items having the value of the version 88 of the current file as the version 91 and the number of the block found through the idle-block searching operation of the step 1305 as the head block number 92 (step 1317). In this connection, since the information to be written in the file information area 11 at the step 1317 are positioned close to each other on the external memory 2, the information can be written through once output operation to the external memory 2. When completing the step 1317, the file control program 6 proceeds to a step 1323. When the file length is not 0 (N in the step 1315), this means that there is present a block which is already allocated to the file, whereby the file control program 6 copies the file status 89 and version 88 of the file information table 8 to the file status 29 and version 28 of the file information area 11 (step 1319), and adds items having the file version 88 and the number of the block found through the idle-block searching operation of the step 1305 as the next block number, to the next block number table information 104 of the block lastly allocated to the file through reference to the last block number 84 (step 1321). The file control program 6 then copies the next block number table stored in the next block number table information section 104 of the block of the block number stored in the last block number 84 to the next block number table 96 stored in the next block number table memory area 95 (step 1322) to update the block allocation table 7 and to change the allocation information 72 of the block found through the idle-block searching operation of the step 1305 to "in use" (step 1323).

When the user program 5 issues the file use start request through the above processing procedure, the file control program 6 changes the file statuses 29 and 89 to "in use" and allocates a block in which data is not written to the end of the file.

Figure 19:
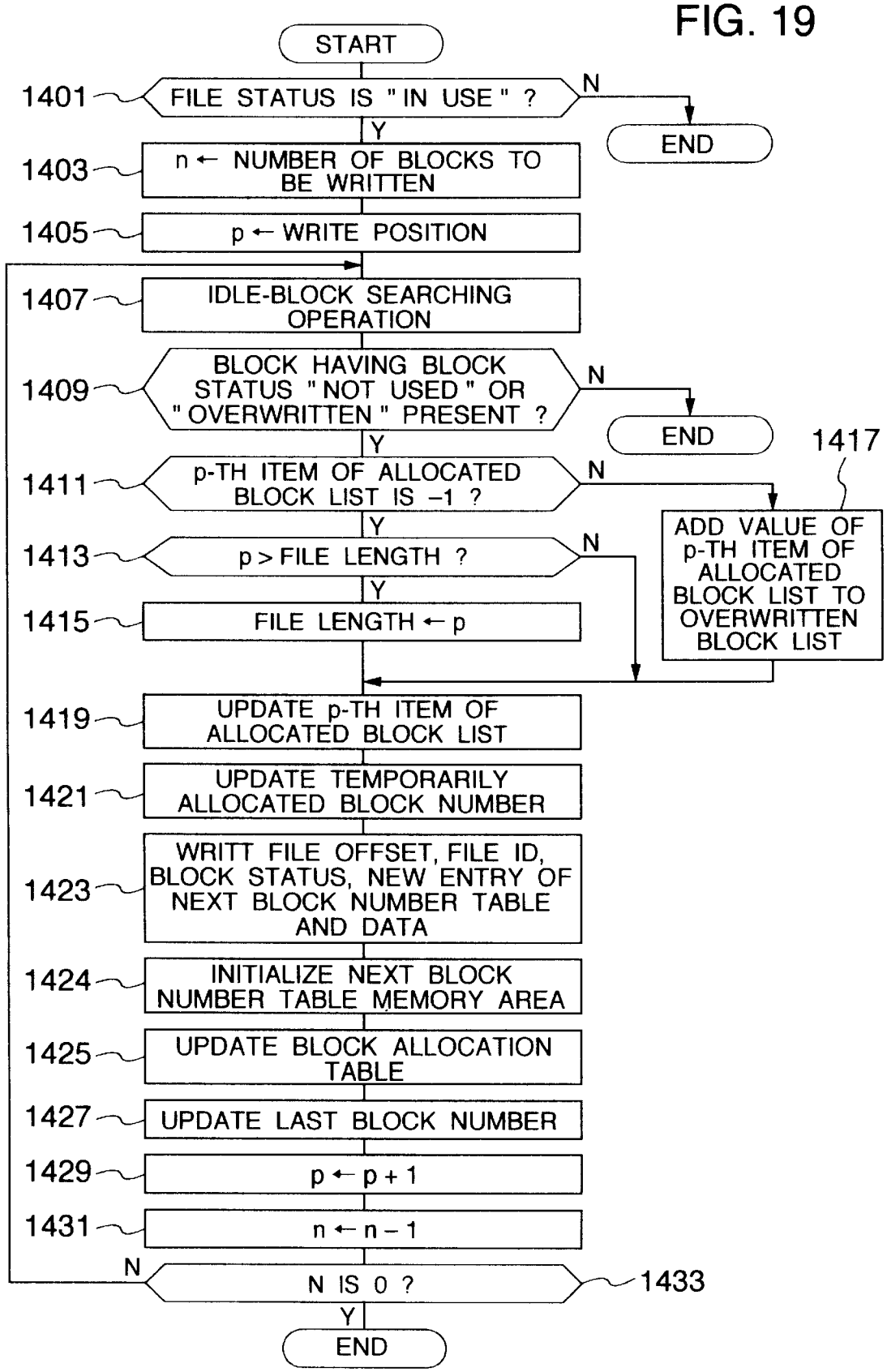
FIG. 19 is a flowchart for explaining a processing procedure of a data write request in the second embodiment.

FIG. 19 is a flowchart for explaining a processing procedure of the file write request in the present embodiment. Even in the present embodiment, it is assumed that, as in the first embodiment, the user program 5 specifies the length of data to be written and a position in a file in which the data is to be written. When receiving the file write request, the file control program 6 first looks up the file information table 8 to judges whether or not the file status 89 is "in use" (step 1401). In the case of not "in use" (N in the step 1401), the file control program 6 terminates its operation because this is a write request to a file not in use. In the case of "in use" (Y in the step 1401), the file control program 6 substitutes into the variable n the number of blocks for the data to be written specified by the user program 5 (step 1403), and substitutes into the variable p a position of the data to be written in the file and specified by the user program 5 (step 1405). The file control program 6 then performs the idle-block searching operation (step 1407). The idle-block searching operation is the same as the operation explained in connection with FIG. 17. Thereafter, the file control program 6 judges, on the basis of a result of the idle-block searching operation of the step 1407, whether or not there is present an idle block which can be used as a data writing block (step 1409). In the absence of an idle block (N in the step 1409), the file control program 6 terminates its operation because there is no block in which the new data can be written. In the presence of an idle block (Y in the step 1409), the file control program 6 looks up the file information table 8 to judge whether or not the p-th item of the allocated block list 83 has a value of −1 (step 1411). In the case of −1 (Y in the step 1411), the file control program 6 can know that no block is allocated to a position at which the user program 5 is to write the data. That is, since writing of the new data may possibly cause increase of the file length, the file control program 6 judges whether or not the p is larger than the current file length 81 (step 1413). When the p is larger than the file length 81 (Y in the step 1413), the file control program 6, which can know that writing of the new data causes increase of the file length, substitutes the value of the p into the file length 81 (step 1415), and then proceeds to a step 1419. When the p is not larger than the file length 81 (N in the step 1413), the file control program 6, which can know that writing of the new data causes no increase of the file length, proceeds to a step 1419. The file length indicates the last written position of the file, so that, when there is a block having no data written between the first written position and the last written position, the above case occurs. When the p-th item of the allocated block list 83 is not −1 (N in the step 1411), this corresponds to an overwriting to an existing block, so that the file control program 6 adds the value of the p-th item of the allocated block list 83 of the block to be overwritten to the overwritten block list 90 (step 1417) and then proceeds to the step 1419. The file control program 6 writes the value of the temporarily allocated block number 85 in the p-th item of the allocated block list 83 of the file information table 8 (step 1419), and then writes, as the temporarily allocated block number 85, the number of the block found through the idle block searching operation of the step 1407 (step 1421). Thereafter, the file control program 6 writes the value of the variable p in the file offset information section 102 of the block having the block number recorded in the p-th item of the allocated block list 83 of the file information table 8, the file ID 87 in the data information section 103 and "in use" in the block status information section 106; writes the current version 88 of the file as the version 97 and adds an item having the number of the block found as the next block number 98 through the idle block searching operation of the step 1407 in the next block number table 96, which is a copy of the next block number table of the block to be written with data, stored in the next block number table memory area 95; writes these version and the next block number in the next block number table information 104; and writes the data specified by the user program 5 in the data information section 103 (step 1423). In this connection, the file offset information 102, file ID information 105, block status information 106, next block number table information 104 and data information 103 are present at positions adjacent to each other on the external memory 2, so that the file control program 6 can write these information collectively through once output operation to the external memory 2. With respect to all the items of the next block number table 96 stored in the next block number table memory area 95 of the file information table 8, the file control program 6 then sets −1 for the version 97 and −1 for the next block number 98 (step 1424). The above contents correspond to the contents of the next block number table of the block having the temporarily allocated block number 85 as the block temporarily allocated to the file. Then file control program 6 updates the block allocation table 7 to set "in use" for the allocation information 72 of the idle block found through the idle-block searching operation of the step 1407 (step 1425) and updates the value of the last block number 84 to the value of the p-th item of the allocated block list 83 of the file information table 8 (step 1427). The file control program 6 next adds 1 to the value of the variable p (step 1429), subtracts 1 from the value of the variable n (step 1431) to judge whether or not the value of n is 0 (step 1433). When n is not 0 (N in the step 1433), this means that there still remains data to be written. Thus, the file control program 6 goes back to the step 1407 to continue the operation. When n is 0 (Y in the step 1433), the file control program 6 terminates its operation.

Through the above procedure, regardless of overwriting or new writing, the file use start request or new file preparation request causes the data specified by the user program 5 to be written on every block basis in the blocks temporarily allocated to the file, causes another new block to be temporarily allocated to the file and also causes an item indicative of the number of the temporarily allocated block to be added to the next block number table having the data written therein.

Figure 20:
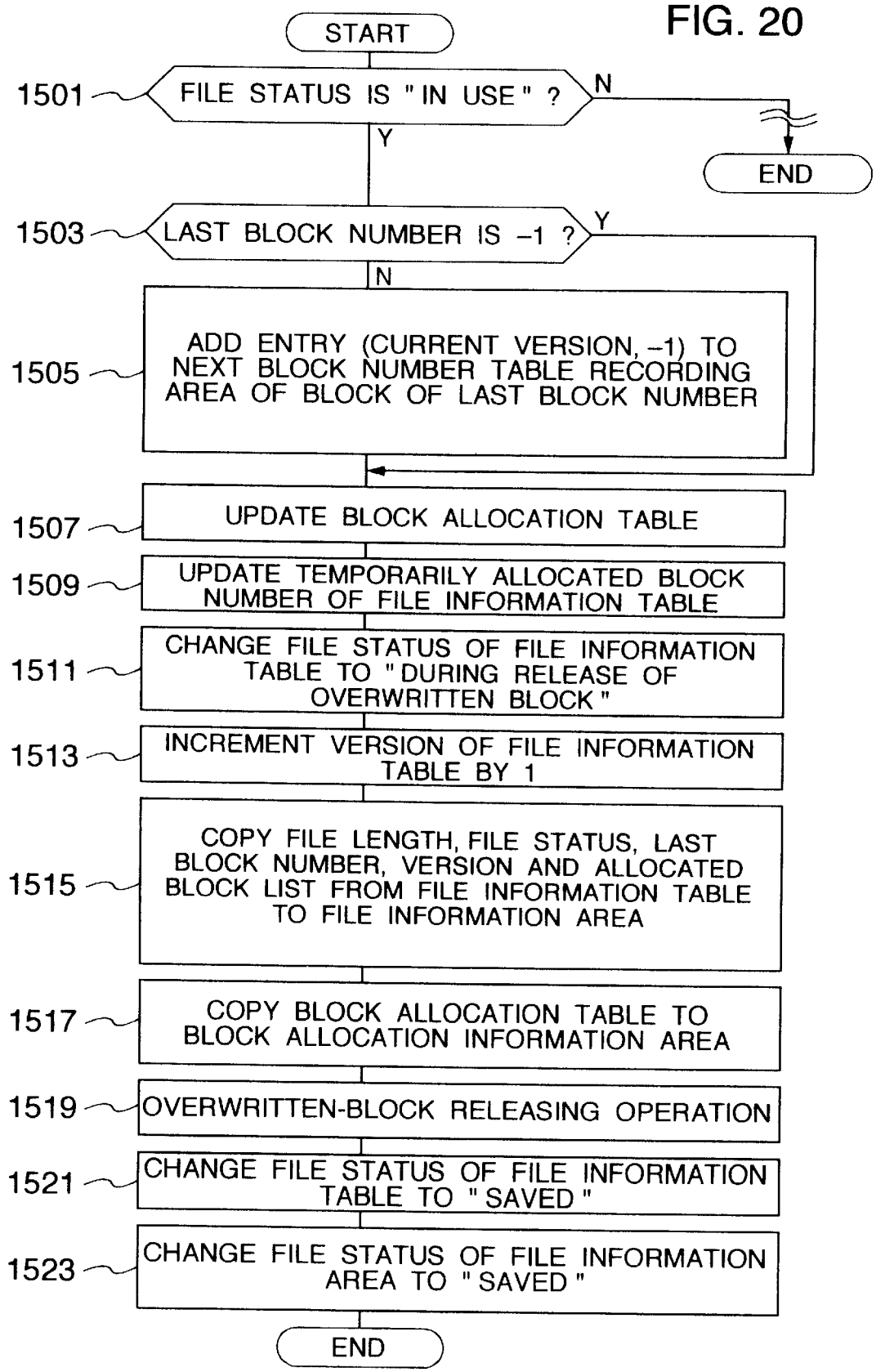
FIG. 20 is a flowchart for explaining a processing procedure of a file use end request in the second embodiment.

FIG. 20 is a flowchart for explaining a processing procedure of the file use end request. When receiving the file use end request, the file control program 6 first judges whether or not the file status 89 of the file information table 8 is "in use" (step 1501). When the file status is not "in use" (N in the step 1501), this request means the file use end request to the file not in use, so the file control program 6 terminates its operation. When the file status is "in use" (Y in the step 1501), the file control program 6 judges whether or not the last block number 84 is −1 (step 1503). In the case of −1 (Y in the step 1503), this request means the use end request to the file having no data written therein, so the file control program 6 proceeds to a step 1507. When the last block number 84 is not −1 (N in the step 1503), this request means the use end request to the file having one or more blocks having no data written therein. Thus, the file control program 6, in the next block number table 96 as a copy of the next block number table of the next block number table information 104 of the block having the last block number 84, writes the current version 88 of the file in the version 97, adds as the next block number 98 an item having a value of −1 that is invalid as the block number, and writes them back in the next block number table information section 104 of the block having the last block number 84 (step 1505). The file control program 6 then updates the block allocation table 7 to set "not in use" for the allocation information 72 of the block having the temporarily allocated block number 85 (step 1507). Then file control program 6 changes the value of the temporarily allocated block number 85 of the file information table 8 to −1 (step 1509). Thereafter, the file control program 6 changes the file status 89 of the file information table 8 to "during release of overwritten block" (step 1511), adds 1 to the version 88 (step 1513), and then copies the file length 81, file status 89, last block number 84, version 88 and allocated block list 83 of the file information table 8 to the file length 21, file status 29, last block number 24, version 28 and allocated block list 23 of the file information area 11 respectively (step 1515). The file control program 6 then copies the contents of the block allocation table 7 to the block allocation information area 12 (step 1517). Through the above procedure, with respect to the control information of the file requested by the user program 5 to terminate its use, the stored contents of the file information table 8 becomes the same as those of the file information area 11. In addition, the block allocation table 7 also becomes the same as the block allocation information area 12 in their stored contents. For this reason, even when a failure occurs in the computer 1 after completion of the step 1517, the information of the file to be required to terminate its use can be restored based on the file information area 11.

Then the file control program 6 performs its overwritten block releasing operation (step 1519). In the present embodiment, even when file data is to be overwritten, the file control program 6 allocates a new block for the data writing and never directly overwrites the data to the block having old data before the overwriting. As long as the file is "in use", the block having the old data stored therein prior to the overwriting is still allocated to the file. To avoid this, in accordance with the present embodiment, the file control program 6, when the file use end request is issued, performs its block releasing operation over blocks overwritten during time period between issuance of the file use start request and issuance of the file use end request. In this conjunction, such an embodiment is also possible that the file control program 6 performs no overwritten-block releasing operation at the time of the file use end request and does it only when the user program 5 issues an overwritten-block releasing request.

After finishing the overwritten-block releasing operation of the step 1519, the file control program 6 changes the file status 89 of the file information table 8 to "saved" (step 1521) and changes the file status 29 of the file information area 11 to "saved" (step 1523), at which stage the file control program 6 terminates its operation.

Figure 21:
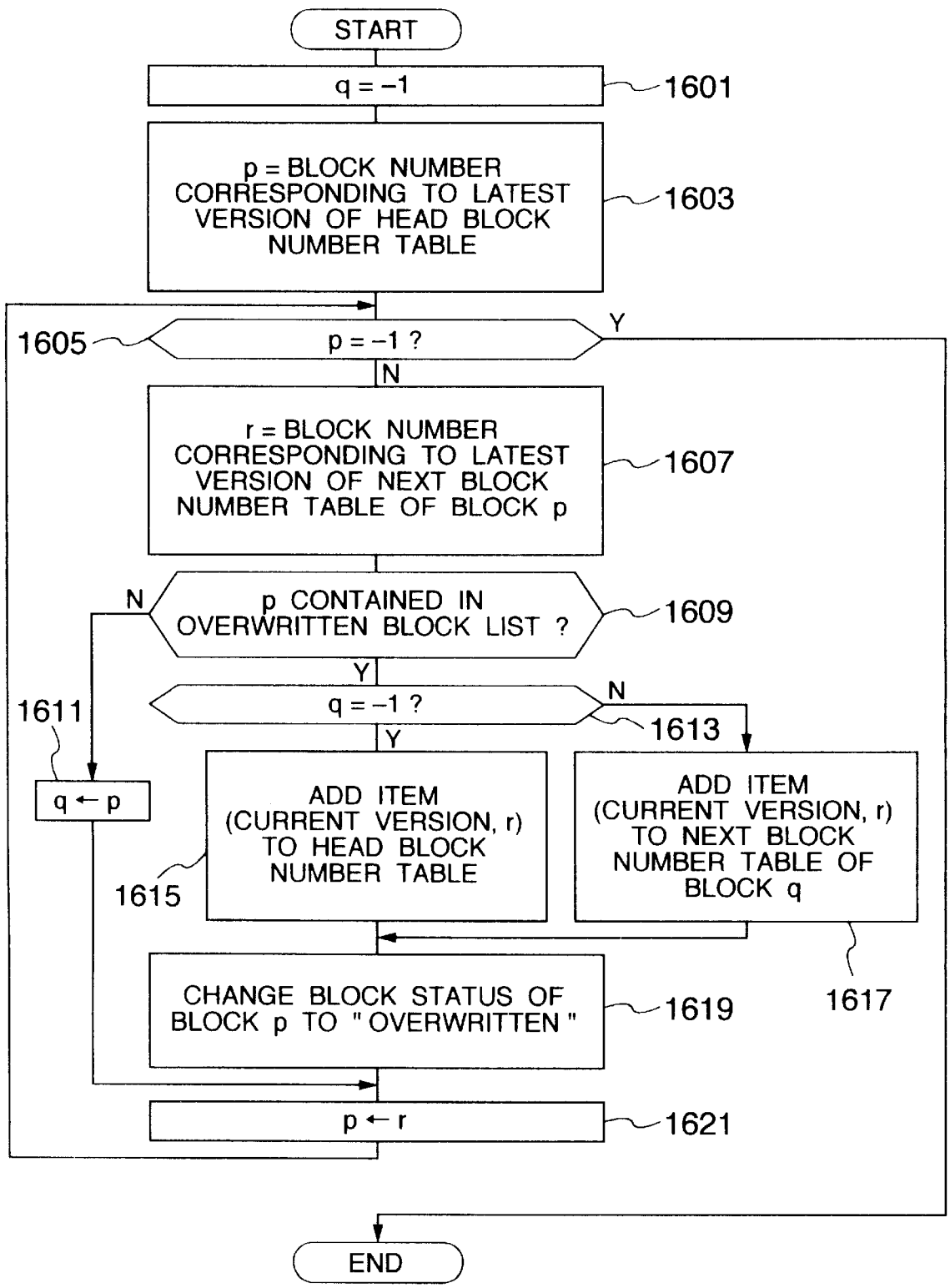
FIG. 21 is a flowchart for explaining a processing procedure of an overwritten block releasing operation of the file use end request in the second embodiment.

FIG. 21 is a flowchart for explaining a processing procedure of the overwritten-block releasing operation of the step 1519. The file control program 6 first substitutes −1 for the variable q (step 1601), and then substitutes for the variable p the value of the head block number 92 corresponding to the latest version 91 of the head block number table 30 of the file information area 11 (step 1603). In the overwritten-block releasing operation, the variable p is used to indicate the number of the overwritten block, while variable q is used to indicate the number of the block allocated prior to the overwritten block in the file. The file control program 6 next judges whether or not the value of the variable p is −1 (step 1605). When the variable p is −1 (Y in the step 1605), the file control program 6 can know that the operation has been completed until the end of the file and thus terminates the overwritten-block releasing operation. When the variable p is not −1 (N in the step 1605), the file control program 6 refers to the next block number table information 104 of the block having the block number p and substitutes for the variable r the block number of the latest version (step 1607). In the overwritten-block releasing operation, the variable r is used to indicate the number of the block allocated at a position next to the block having the block number p. Next, looking up the file information table 8, the file control program 6 judges whether or not the value of the variable p is contained in the overwritten block list 90 of the file currently being processed (step 1609). When the value of the variable p is not contained in the overwritten block list (N in the step 1609), the file control program 6 knows that the block of the block number p is not overwritten, substitutes the value of the variable p for the variable q and then goes to a step 1621. When the value of the variable p is contained in the overwritten block list 90 (Y in the step 1609), the file control program 6 knows that the block of the block number p is overwritten and thus judges whether or not the variable q is −1 (step 1613). When the variable q is −1 (Y in the step 1613), the block of the block number p is the block allocated to the head of the file, so that the file control program 6 adds items having the version 88 of the current file as the version 91 and having the value of the variable r as the block number in the head block number table 30 of the file to be processed (step 1615), changes the block status information 106 of the block having the block number p to "overwritten" (step 1619), and then proceeds to a step 1621. When the variable q is not −1 (N in the step 1613), the block of the block number p is the block allocated to a part of the file other than the head and the number of the block allocated at the position previous to the block number p is held by the variable q, so that the file control program 6 adds items having the version 88 of the current file as a version and having the value of the variable r as the block number, in the next block number table information section 104 of the block having the block number q (step 1617), and then proceeds to a step 1619. The file control program 6 substitutes the value of the variable r for the variable p (step 1621), and returns to the step 1605 to perform the operation over the next block.

Through the above procedure, only with respect to the blocks other than the blocks recorded in the overwritten block list 90, by sequentially tracing the next block number corresponding to the latest version, which is written in the next block number table information 104, the file control program 6 can follow these blocks starting with the block allocated to the head of the file and ending in the block allocated to the tail of the file. With regard to the blocks recorded in the overwritten block list 90, the status of the block status information 106 is changed to "overwritten". In other words, the overwritten block is released from the file.

Figure 22:
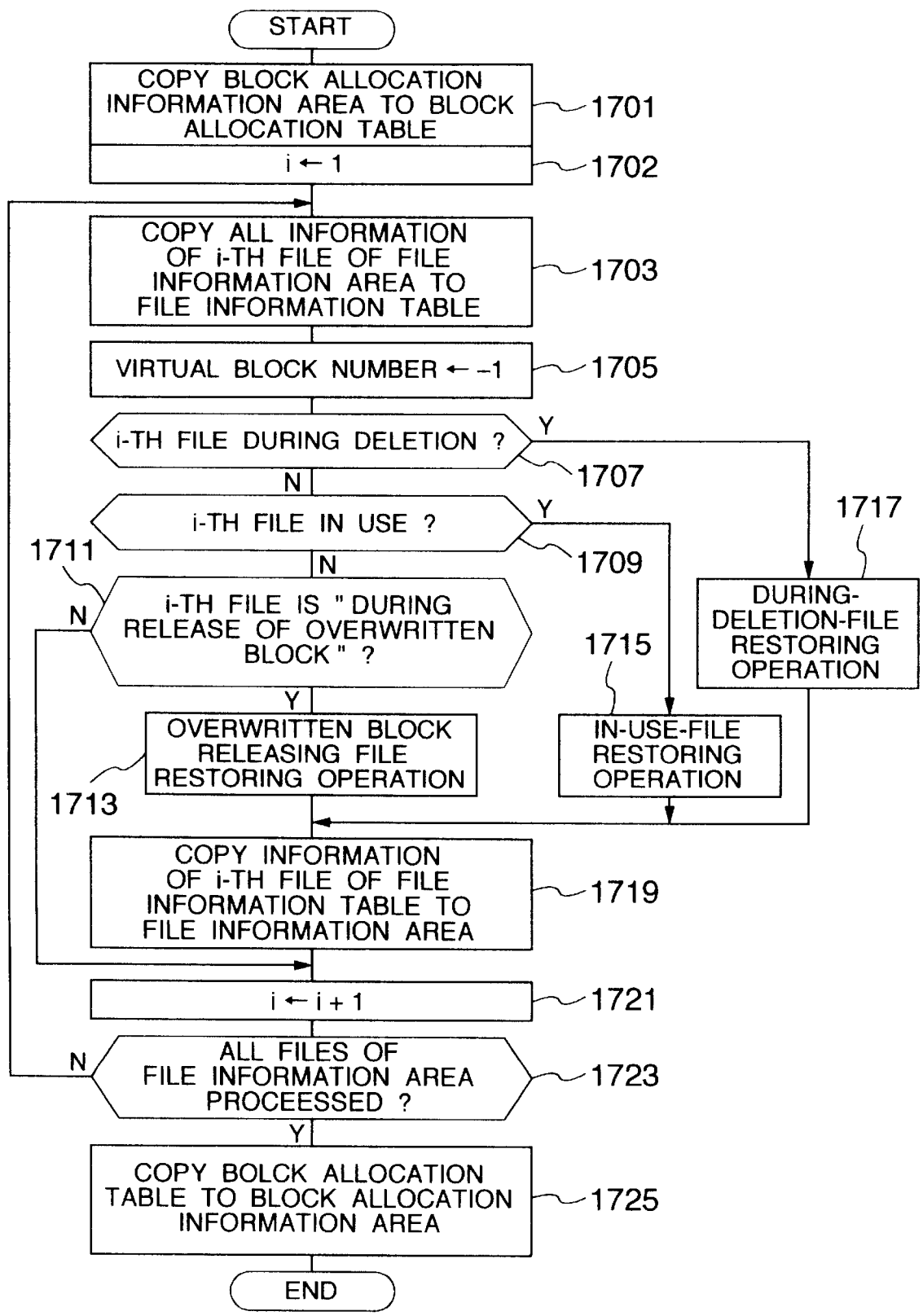
FIG. 22 is a flowchart for explaining a processing procedure of a file information restoring operation in the second embodiment.

FIG. 22 is a flowchart for explaining a processing procedure of the file information restoring operation in the present embodiment. The file information restoring operation is executed by the file control program 6 after a failure takes place in the computer 1, that is, under a condition that the contents of the file information table 8 and block allocation table 7 are missing or lost. In the file information restoring operation, the file information table 8, block allocation table 7 and block allocation information area 12 are restored with use of the next block number table information 104, file offset information 102, file ID information 105 and block status information 106 of the blocks in the file information area 11 and data area 13.

When the file information restoring operation is executed, the file control program 6 first copies the block allocation information area 12 to the block allocation table 7 (step 1701), and substitutes 1 for the variable i (step 1702). Then the file control program 6 copies the file name 20, file length 21, file status 29, allocated block list 23 and last block number 24 of the i-th file of the file information area 11 to the file name 80, file length 81, file status 89, allocated block list 83 and last block number 84 of the i-th file of the file information table 8, respectively (step 1703). Thereafter, the file control program 6 stores −1 as the temporarily allocated block number 85 (step 1705), and judges whether or not the file status 89 of the i-th file of the file information table 8 is "during deletion" (step 1707). When the file status 89 is "during deletion" (Y in the step 1707), the file control program 6 carries out during-deletion-file restoring operation (step 1717), and then proceeds to a step 1719. When the file status 89 is not "during deletion" (N in the step 1707), the file control program 6 judges whether or not the file status 89 of the i-th file of the file information table 8 is "in use" (step 1709). When the file status 89 is "in use" (Y in the step 1709), the file control program 6 carries out the in-use-file restoring operation (step 1715), and then proceeds to a step 1719. When the file status 89 is not "in use" (N in the step 1709), the file control program 6 judges whether or not the file status 89 of the i-th file of the file information table 8 is "during release of overwritten block" (step 1711). In the case of "during release of overwritten block" (Y in the step 1711), the file control program 6 performs the overwritten block releasing file restoring operation (step 1713), and proceeds to a step 1719. In the step 1719, the file control program 6 copies the file name 80, file length 81, file status 89, allocated block list 83 and last block number 84 of the i-th file of the file information table 8 restored as a result of the during-deletion-file restoring operation, in-use-file restoring operation or overwritten block releasing file restoring operation to the file name 20, file length 21, file status 29, allocated block list 23 and last block number 24 of the i-th file of the file information area 11 respectively (step 1719), and then proceeds to a step 1721. When the file status 89 is not "during release of overwritten block" (N in the step 1711), the file control program 6 proceeds to a step 1721 if the file status 89 is not "during deletion" nor "in use" nor "during release of overwritten block", that is, if the file status 89 is "saved" or "deleted" and thus no updating of file information is carried out. In the step 1721, the file control program 6 adds 1 to the variable i (step 1721), and judges whether or not the value of the variable i exceeds the number of lines in the file information area 11, that is, whether or not to have finished the operation of all the files controlled by the file information area 11 (step 1723). When failing to have finished the operation of all the files (N in the step 1723), the file control program 6 returns to the step 1703) to continue the operation. When finishing the operation of all the files (Y in the step 1723), the file control program 6 copies the block allocation table 7 whose contents at the time of a failure occurrence in the computer 1 are restored through the so-far procedure, to the block allocation information area 12 (step 1725), thus terminating its operation.

Through the aforementioned procedure, the file control program 6 can extract only files necessary for the restoring operation of the step 1713, 1715 or 1717 on the basis of the file status 29 of each file, and can execute the restoring operation of the type corresponding to the status.

Since the during-deletion-file restoring operation of the step 1717 and the in-use-file restoring operation of the step 1715 in the present embodiment are similar to those in the first embodiment, explanation thereof is omitted. However, the present embodiment is different from the first embodiment in that the head block number table 30 is used in place of the head item 83-1 of the allocated block list 83 in the steps 805 and 903 and in that the block number of the latest version of not the next block number information 101 but the next block number table information 104 is used in the steps 817 and 909.

Figure 23:
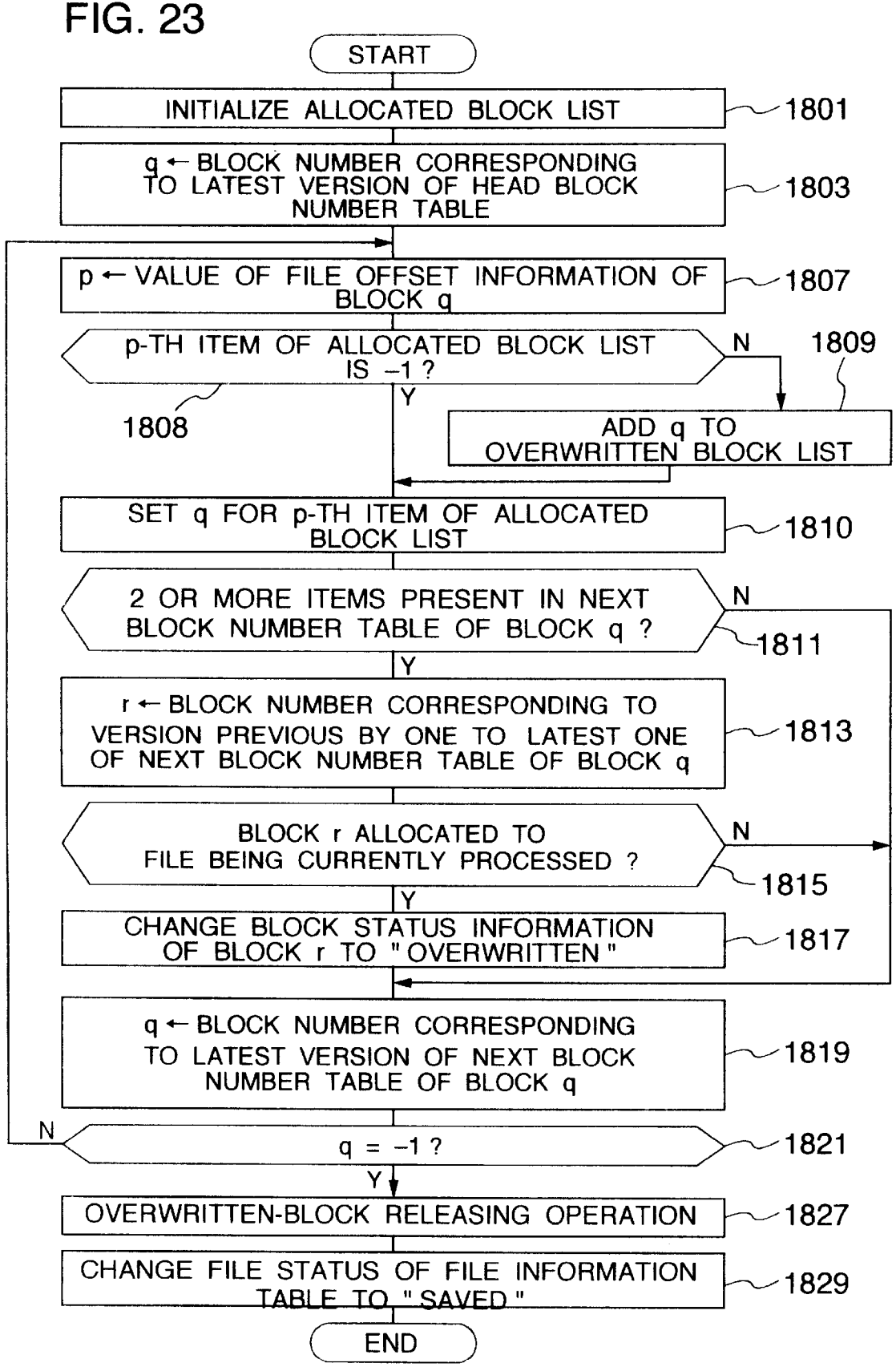
FIG. 23 is a flowchart for explaining a processing procedure of an overwritten block releasing file restoring operation of the file information restoring operation in the second embodiment.

FIG. 23 is a flowchart for explaining a processing procedure of overwritten block releasing file restoring operation in the present embodiment. The file control program 6 first initializes the allocated block list 83 corresponding to the file to be processed in the file information table 8 (step 1801). The file control program 6 then substitutes for the variable q the head block number 92 corresponding to the latest version 91 of the head block number table 30 of the file to be processed in the file information area 11 (step 1803). Next the file control program 6 substitutes for the variable p the contents of the file offset information 102 of the block having the block number q (step 1807), and judges whether or not the p-th item of the allocated block list 83 has a value of −1 (step 1808). When the p-th item is not −1 (N in the step 1808), the file control program 6 adds the value of the variable q to the overwritten block list 90 (step 1809), and proceeds to a step 1810. When the p-th item is −1 (Y in the step 1808), the file control program 6 writes the value of the variable q in the p-th item of the allocated block list 83 (step 1810). Thereafter, the file control program 6, referring to the next block number table information 104 of the block having the block number q, judges whether or not 2 or more items are recorded in the next block number table (step 1811). When 2 or more items are not recorded (N in the step 1811), the file control program 6 knows that data was overwritten to the block of the block number q, and thus proceeds to a step 1819. When 2 or more items are recorded (Y in the step 1811), the file control program 6 substitutes for the variable r the contents of the block number corresponding to the version previous by one to the latest one of the items of the next block number table information 104 of the block having the block number q (step 1813). Next the file control program 6 refers to the file ID information 105 and block status information 106 of the block having the block number r, and judges whether or not the block of the block number r is allocated to the file to be now processed (step 1815). When the value of the file ID information 105 does not coincide with the file status 89 or when the contents of the block status information 106 is not "in use", the file control program 6 knows that the block of the block number r is not allocated to the file (N in the step 1815), the file control program 6 proceeds to a step 1819. When the value of the file ID information 105 coincides with the file status 89 and when the value of the block status information 106 is "in use", the file control program 6 knows that a failure occurred in the computer 1 at the time point after the completion of the step 1615 or 1617 and before the completion of the step 1619. Thus, the file control program 6 changes the block status information 106 of the block having the block number r to "overwritten" (step 1817), and substitutes for the variable q the contents of the block number corresponding to the latest version of the next block number table information 104 of the block of the block number q (step 1819). Next, the file control program 6 judges whether or not the variable q has a value of −1 (step 1821). When the value of the variable q is not −1 (N in the step 1821), the file control program 6 returns to the step 1807 to continue the operation. When the value of the variable q is −1 (Y in the step 1821), the file control program 6 knows that the operation has been carried out until the last of the file, the program proceeds to a step 1827. Through the foregoing operations, the file control program 6 can record ones of the blocks allocated to the file in question overwritten during a time period between the use start request to the use end request in the overwritten block list 90, whereby the file control program 6 performs the overwritten-block releasing operation (step 1827), changes the file status 89 of the file information table 8 to "saved" (step 1829), thus terminating its operation. The overwritten-block releasing operation is the same as that explained in connection with FIG. 21.

Figure 24:
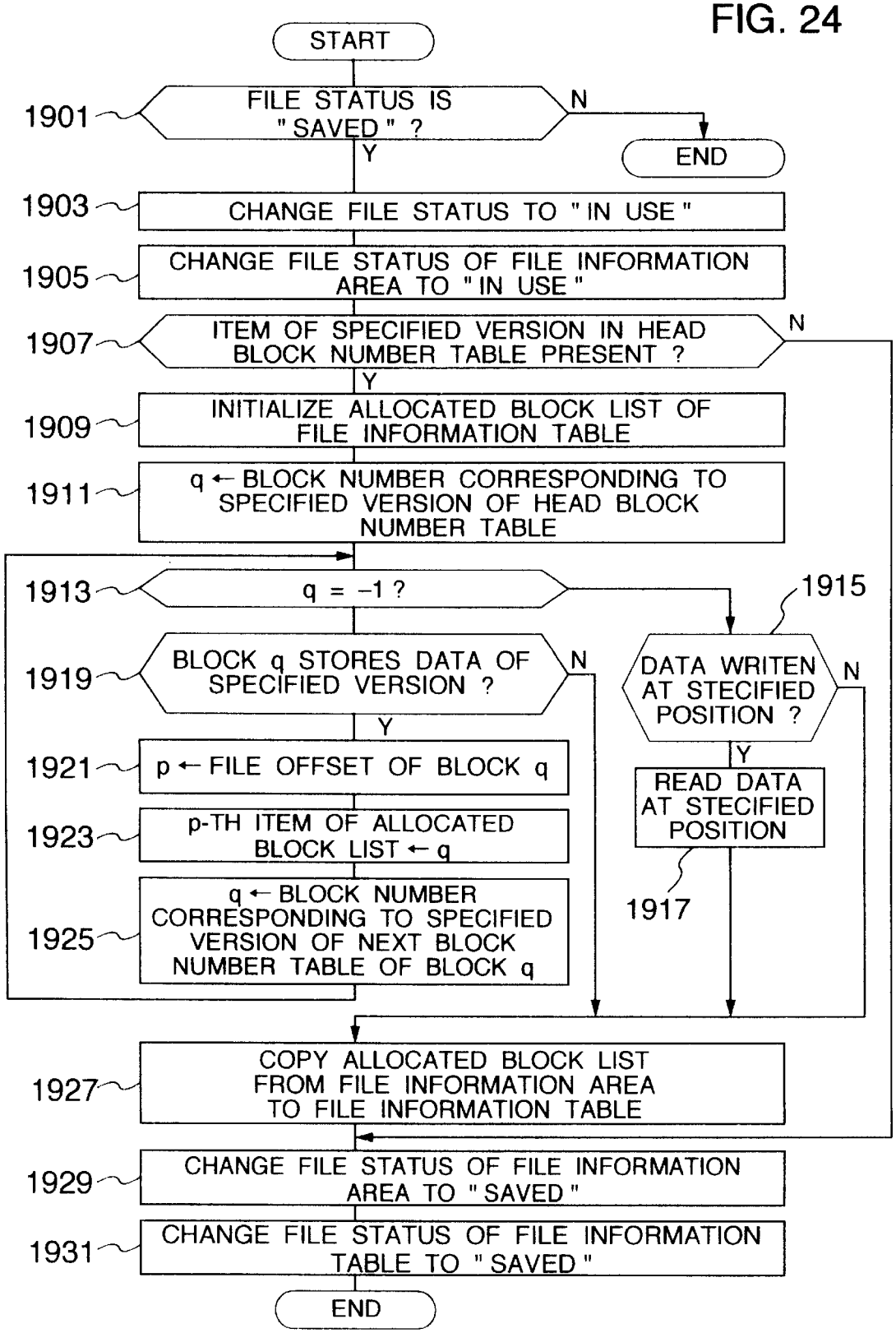
FIG. 24 is a flowchart for explaining a processing procedure of an old version data read request in the second embodiment.

FIG. 24 is a flowchart for explaining a processing procedure of the old-version data read request. The old-version data read request is issued from the user program 5 when it is desired to read data already stored when the file is of the version older than the current version.

The user program 5 specifies the version of data to be read out, a data read start position thereof within the file, and an amount of read as parameters of the old-version data read request. In the present embodiment, the version 88 is 0 at the time of new file preparation and thereafter is incremented by 1 for every file use end and start requests. The file prior to the execution of the file use end request is different from the file after the execution thereof in version 88. The substantial difference is whether the overwritten block is released or not, and these files are the same in the data stored therein. Thus, the version 88 (for example, 2) updated after the file use start request and the version 88 (for example, 3) after issuance of the file use end request thereafter can be regarded as the same.

When receiving the old-version data read request, the file control program 6 first looks up the file information table 8 and judges whether or not the file status 89 of the file specified by the user program 5 is "saved" (step 1901). When the file status is not "saved" (N in the step 1901), the file control program 6 terminates its operation. When the file status is "saved" (Y in the step 1901), the file control program 6 changes to "in use" the file status 89 of the file, from which the user program 5 requested to read the old version data, of the file information table 8 (step 1903), and also changes to "in use" the file status 29 of the file of the file information area 11 (step 1905). Next, the file control program 6 looks up the head block number table 30 of the file requested by the user program 5 to read the old version data, and judges the presence or absence of the head block number 92 of the version specified by the user program 5 (step 1907). In the absence of the head block number 92 (N in the step 1907), this means that there is no file of the version and thus the file control program 6 proceeds to a step 1929. In the presence of the head block number 92 (Y in the step 1907), the file control program 6 initializes the allocated block list 83 by substituting −1 for all the items of the allocated block list 83 of the file of the file information table 8 requested by the user program 5 to read the old version data (step 1909). Next, the file control program 6 substitutes for the variable q the value of the head block number 92 of the version specified by the user and stored in the head block number table 30 looked up at the step 1907 (step 1911). Thereafter, the file control program 6 judges whether or not the value of the variable q is −1 (step 1913). When the value of the variable q is −1 (Y in the step 1913), the file control program 6 knows that all the blocks allocated to the file of the old version have been all recorded in the allocated block list 83, and thus proceeds to a step 1915. In the step 1915, the file control program 6 refers to the allocated block list and judges whether or not there was a block allocated at a read start position specified by the user program 5 of the file of the version also specified by the user program 5. When no block is allocated (N in the step 1915), the file control program 6 cannot read the old version data and thus proceeds to a step 1927. When a block is allocated (Y in the step 1915), the file control program 6 reads out an amount of data specified by the user program 5 (step 1917), and proceeds to a step 1927. When the value of the variable q is not −1 (N in the step 1913), the file control program 6 judges whether or not the block having the block number q stores therein the data of the file specified by the user program 5, by comparing the file ID 87 of the file information table 8 with the file ID information 105 of the block of the block number q (step 1919). When the specified data is not stored (N in the step 1919), the file control program 6 proceeds to a step 1927 because the data of the file of the version specified by the user program 5 is already lost. When the specified data is stored (Y in the step 1919), the file control program 6 substitutes for the variable p the value of the file offset information 102 of the block having the block number q (step 1921). Thereafter, the file control program 6 substitutes the value of the variable q for the p-th item of the allocated block list (step 1923). The file control program 6 then substitutes for the variable q the next block number of the version of the next block number table information 104 of the block of the block number q specified by the user program 5 (step 1925), and returns to the step 1913 to continue the operation.

In the step 1927, the reading of the old version data is already normally terminated or already failed, the file control program 6 copies the allocated block list 23 of the file information area 11 corresponding to the current version to the allocated block list 83 of the file information table 8 (step 1927). Thereafter, the file control program 6 changes the file status 29 of the file information area 11 to "saved" (step 1929), changes the file status 89 of the file information table 8 to "saved" (step 1931), and terminates its operation.

In accordance with the second embodiment, it is possible to restore file information when a failure takes place in the computer 1 as in the first embodiment. Accordingly, it can be avoided that data already written in the file at the time of the failure occurrence in the computer 1 cannot be extracted, with substantially no increase in overhead at the time of writing to the file. Further, when the user specifies the version of the file, it becomes possible to read out the contents of the specified version of file.

In accordance with the present invention, when it is desired to add a new data block to a file, it becomes advantageously possible to use a preallocated block and also to record an end of the file in the form of a block format. In accordance with the present invention, further, the block number of a block first allocated to a file is saved on the external memory, and the data and the number of a block next linked thereto or a flag indicative of an idle block is recorded in each block, so that, when a failure takes place in the computer, information of the file being written therein can be restored without substantially any increase in the overhead to the external memory. In the present invention, furthermore, not only the above new data block can be advantageously added but also data prior to updating of data in the file can be advantageously saved. In the present invention, in addition, since the version to which each block belongs can be recorded, easy access to the data block of a specified version can be realized.

What is claimed is:

1. A method for controlling files in a computer system having an external memory for storing therein files each made up of a plurality of blocks and a computer connected to the external memory for, when it is desired to add new data in a file, causing a file control program to run to newly allocate a not-used block of the external memory to the file, the method comprising the steps of:

prior to addition of the new data block to the file, previously allocating a spare not-used block to the file; and when the new data block is added to the file, storing the new data in the previously-allocated not-used block and further allocating another spare not-used block to the file.

2. A file control method as set forth in claim 1, wherein the spare not-used block is previously allocated to the file when new preparation of the file is started and when use of an existing file is started, and the allocation of the spare not-used block is released when the use of the file ends.

3. A file control method as set forth in claim 1, wherein a number of a block first allocated to the file is recorded on the external memory as file information, and data and the number of a block next linked thereto or an identifier indicative of an idle block is recorded in each block allocated to the file.

4. A file control method as set forth in claim 3, wherein an allocated block list in which the numbers of blocks allocated to the file are arranged in an order of positions of the blocks (relative block numbers) in the file, is previously stored in a main memory of the computer, so that, when it is desired to add new data to the file, a number of a block storing the new data is sequentially added to the allocated block list.

5. A file control method as set forth in claim 4, wherein, when operation of adding the new data to the file is interrupted, the file information recorded in the external memory and the next linked block number recorded in each block are sequentially traced up to an idle block to thereby restore the allocated block list in the main memory.

6. A file control method as set forth in claim 1, wherein information on blocks indicative of a status "in use" or "not used" possessed by the external memory are previously stored on a main memory of the computer in the form of a block allocation table, and each time a not-used block is allocated to the file, an allocation status of the not-used block in the table is updated from "not used" to "in use".

7. A file control method as set forth in claim 1, wherein a number of a not-used block sparely allocated to the file is stored in the main memory as a temporarily allocated block number and, each time a spare not-used block is allocated to the file, the temporarily allocated block number is updated.

8. A method for controlling files in a computer system having an external memory for storing therein files each made up of a plurality of blocks and a computer connected to the external memory for, when it is desired to add new data in a file, causing a file control program to run to newly allocate a not-used block of the external memory to the file, the method comprising the steps of:

prior to data writing of the block added to the file for the new data or of the block for the existing data block updating, previously allocating a spare not-used block to the file; and when the data writing is carried out, storing new writing data in the previously-allocated not-used block and allocating another spare not-used block to the file.

9. A file control method as set forth in claim 8, wherein, each time use of the file is started, a version of the file is updated, the version of the file and a number of the block first allocated for the file version are recorded in the external memory as file information, and data and a number of the block to be next linked for the version of the block or an identifier indicative of an idle block are recorded in each block allocated to the file.

10. A file control method as set forth in claim 9, wherein, when the version is specified, a number of the head block of the file of the specified version is acquired by referring to the file information, the number of the next linked block of the specified version are sequentially traced up to an idle block to thereby prepare an allocated block list in which the numbers of the blocks in the file of the specified version are arranged in an order of block positions (relative block numbers) in the file, and access is made to the block corresponding to the specified block position on the basis of the allocated block list.

11. A recording medium storing a file control program stored therein, when new data is added to a file made of a plurality of blocks stored in an external memory, newly allocating a not-used block of the external memory to the file, the program performing the steps of:

prior to addition of the new data block to the file, previously allocating a spare not-used block to the file; and when the new data block is added to the file, storing the new data in the previously-allocated not-used block and further allocating another spare not-used block to the file.

12. A recording medium storing a file control program stored therein, when new data is added to a file made of a plurality of blocks stored in an external memory, newly allocating a not-used block of the external memory to the file, the program performing the steps of:

prior to data writing of the block added to the file for the new data or of the block for the existing data block updating, previously allocating a spare not-used block to the file; and when the data writing is carried out, storing new writing data in the previously-allocated not-used block and allocating another spare not-used block to the file.

13. A file control system having an external memory for storing therein files each made up of a plurality of blocks and a computer connected to the external memory for, when it is desired to add new data in a file, causing a file control program to run to newly allocate a not-used block of the external memory to the file, comprising:

means, prior to addition of the new data block to the file, for previously allocating a spare not-used block to the file; and means, when the new data block is added to the file, for storing the new data in the previously-allocated not-used block and for further allocating another spare not-used block to the file.

14. A file control system having an external memory for storing therein files each made up of a plurality of blocks and a computer connected to the external memory for, when it is desired to add new data in a file, causing a file control program to run to newly allocate a not-used block of the external memory to the file, comprising:

prior to data writing of the block added to the file for the new data or of the block for the existing data block updating, means for previously allocating a spare not-used block to the file; and when the data writing is carried out, means for storing new writing data in the previously-allocated not-used block and for allocating another spare not-used block to the file.

* * * * *